(12) United States Patent
Van Lieshout et al.

(10) Patent No.: US 10,805,977 B2
(45) Date of Patent: *Oct. 13, 2020

(54) METHOD AND APPARATUS FOR RECONFIGURING A BEARER

(71) Applicant: Samsung Electronics Co., Ltd., Suwon-si, Gyeonggi-do (KR)

(72) Inventors: Gert Jan Van Lieshout, Apeldoorn (NL); Soenghun Kim, Suwon-si (KR); Himke Van Der Velde, Zwolle (NL); Wooseong Kim, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,253

(22) Filed: Dec. 31, 2018

(65) Prior Publication Data

US 2019/0141774 A1    May 9, 2019

Related U.S. Application Data

(63) Continuation of application No. 15/033,477, filed as application No. PCT/KR2014/010334 on Oct. 31, 2014, now Pat. No. 10,172,179.

(30) Foreign Application Priority Data

Nov. 1, 2013  (GB) .................................. 1319312.3
May 7, 2014  (GB) .................................. 1408072.5
Aug. 5, 2014  (GB) .................................. 1413854.9

(51) Int. Cl.
*H04W 76/00*    (2018.01)
*H04W 76/25*    (2018.01)
(Continued)

(52) U.S. Cl.
CPC ........... *H04W 76/25* (2018.02); *H04L 1/1829* (2013.01); *H04L 1/1867* (2013.01);
(Continued)

(58) Field of Classification Search
CPC .................................................. H04W 76/045
See application file for complete search history.

(56) References Cited

U.S. PATENT DOCUMENTS

2004/0052229 A1    3/2004  Terry et al.
2010/0118781 A1    5/2010  Petrovic et al.
(Continued)

FOREIGN PATENT DOCUMENTS

CN         1805591 A       7/2006
EP         2 190 149 A1    5/2010
(Continued)

OTHER PUBLICATIONS

3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects, (Release 12); Oct. 2013; pp. 1-52; 3GPP TR 36.842 V0.4.0.

(Continued)

*Primary Examiner* — John D Blanton
(74) *Attorney, Agent, or Firm* — Jefferson IP Law, LLP

(57) ABSTRACT

A data transmission method of a User Equipment, UE, in a Long Term Evolution, LTE, compliant mobile communications network, and a corresponding UE. The method comprises detecting reconfiguration of a bearer from a split bearer in which uplink Packet Data Convergence Protocol, PDCP, Protocol Data Units, PDUs, are transmitted to both a Master eNB, MeNB, and to a Secondary eNB, SeNB, to a non-split bearer in which uplink PDCP PDUs are transmitted only to the MeNB. If reconfiguration of a bearer from a split (Continued)

bearer to a non-split bearer in which uplink PDCP PDUs are transmitted to the MeNB is detected, the method further comprises initiating retransmission of PDCP PDUs from the first PDCP PDU for which transmission was attempted via the SeNB and for which there has been no confirmation of successful delivery by a protocol layer below the PDCP layer within the UE. The method further comprises retransmitting only PDCP PDUs for which transmission of the PDU was attempted via the SeNB.

15 Claims, 21 Drawing Sheets

(51) Int. Cl.
*H04W 76/20* (2018.01)
*H04L 1/18* (2006.01)
*H04W 76/19* (2018.01)
*H04W 72/04* (2009.01)
*H04L 1/00* (2006.01)
*H04W 36/00* (2009.01)

(52) U.S. Cl.
CPC .......... *H04L 1/1893* (2013.01); *H04W 72/04* (2013.01); *H04W 76/19* (2018.02); *H04W 76/20* (2018.02); *H04L 2001/0092* (2013.01); *H04L 2001/0096* (2013.01); *H04W 36/0055* (2013.01); *H04W 36/0069* (2018.08)

(56) References Cited

U.S. PATENT DOCUMENTS

| | | | |
|---|---|---|---|
| 2013/0088960 A1* | 4/2013 | Bi ........................... | H04L 47/34 370/235 |
| 2014/0056243 A1* | 2/2014 | Pelletier ................ | H04W 74/04 370/329 |
| 2014/0194126 A1 | 7/2014 | Tsuboi et al. | |

FOREIGN PATENT DOCUMENTS

| | | |
|---|---|---|
| JP | 2013-42264 A | 2/2013 |
| WO | 2014/056130 A1 | 4/2014 |

OTHER PUBLICATIONS

NTT Docomo et al.; "UP bearer split comparison (3C vs 3D)"; 3rd Generation Partnership Project 3GPP; vol. RAN WG2 Sep. 28, 2013; Ljbljana, Slovenia; R2-133275.

Huawei et al.; "Analysis of Latency Related Issues for UP Protocol Alternatives", 3GPP; vol. RAN WG2, F-06921; rukuoka, Japan; May 11, 2013; R2-131786.

Samsung; "Report on [87#23][L TE/DC] PDCP issues (Samsung)"; 3GPP; vol. RAN WG2; F-06921; Dresden, Germany; Oct. 2, 2014; R2-144319.

"Up bearer split comparison (3C vs. 30)", R2-133275, NTT Docomo, Aug. 11, 2013.

LG Electronics Inc.,'Throughput enhancement bybearer splitting for dual connectivity' R2-13xxxx, 3GPP TSG-RAN2 Meeting #83, Aug. 2013, Barcelona, Spain, pp. 1-4.

Intel Corporation, 'Challenges in the uplink to support dual connectivity', R2-132860, 3GPP TSG RAN WG2 Meeting #83, Aug. 10, 2013, Barcelona, Spain, pp. 1-7.

'Overall procedures for offloading over Xn', R2-133419, 3GPP TSG RAN WG2 Meeting #83bis, Sep. 28, 2013, Ljubljana, Slovenia, pp. 1-9.

CATT, 'Signaling Impact over S1/Xn', R3-131711, 3GPP TSG RAN WG3 #81Bbis, Sep. 28, 2013, Venice, Italy, pp. 1-6.

Ericsson, 'BSR and LCP procedures for split bearers' 3GPP TSG-RAN2 Meeting #84, Nov. 11, 2013-Nov. 15, 2013 San Francisco, USA, pp. 1-4.

3rd Generation Partnership Project; Technical Specification Group Radio Access network; Evolved Universal Terrestrial Radio Access (E-UTRA); Packet Data Convergence Protocol (PDCP) specification (Release 11), 3GPP TS 36.323 V11.2.0 (Mar. 2013), Mar. 2013.

Nokia Siemens Networks (RAPPORTEUR); Email Discussion Report on U-Plane Alternatives [81bis#19]; 3GPP TSG-RAN WG2 Meeting #82; R2-131621; May 20-24, 2013; Fukuoka, Japan.

Japanese Office Action with English translation dated Mar. 9, 2020; Japanese Appln. No. 2018-222726.

* cited by examiner

FIG. 5
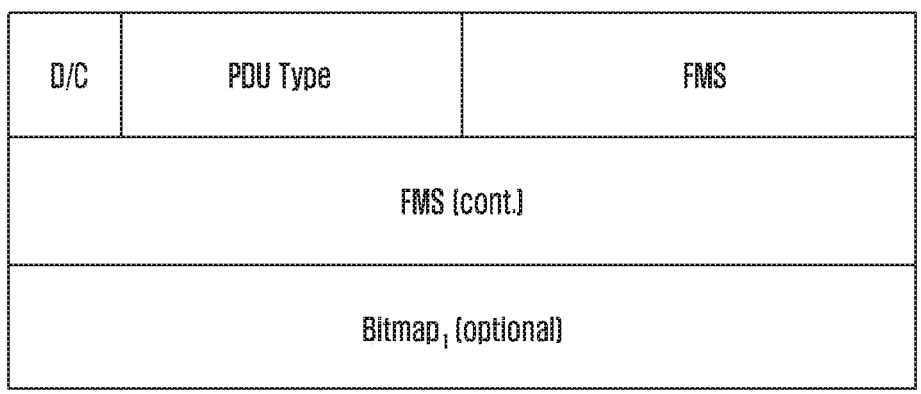
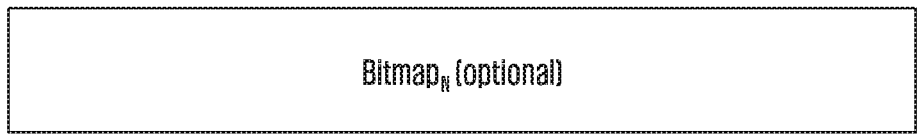

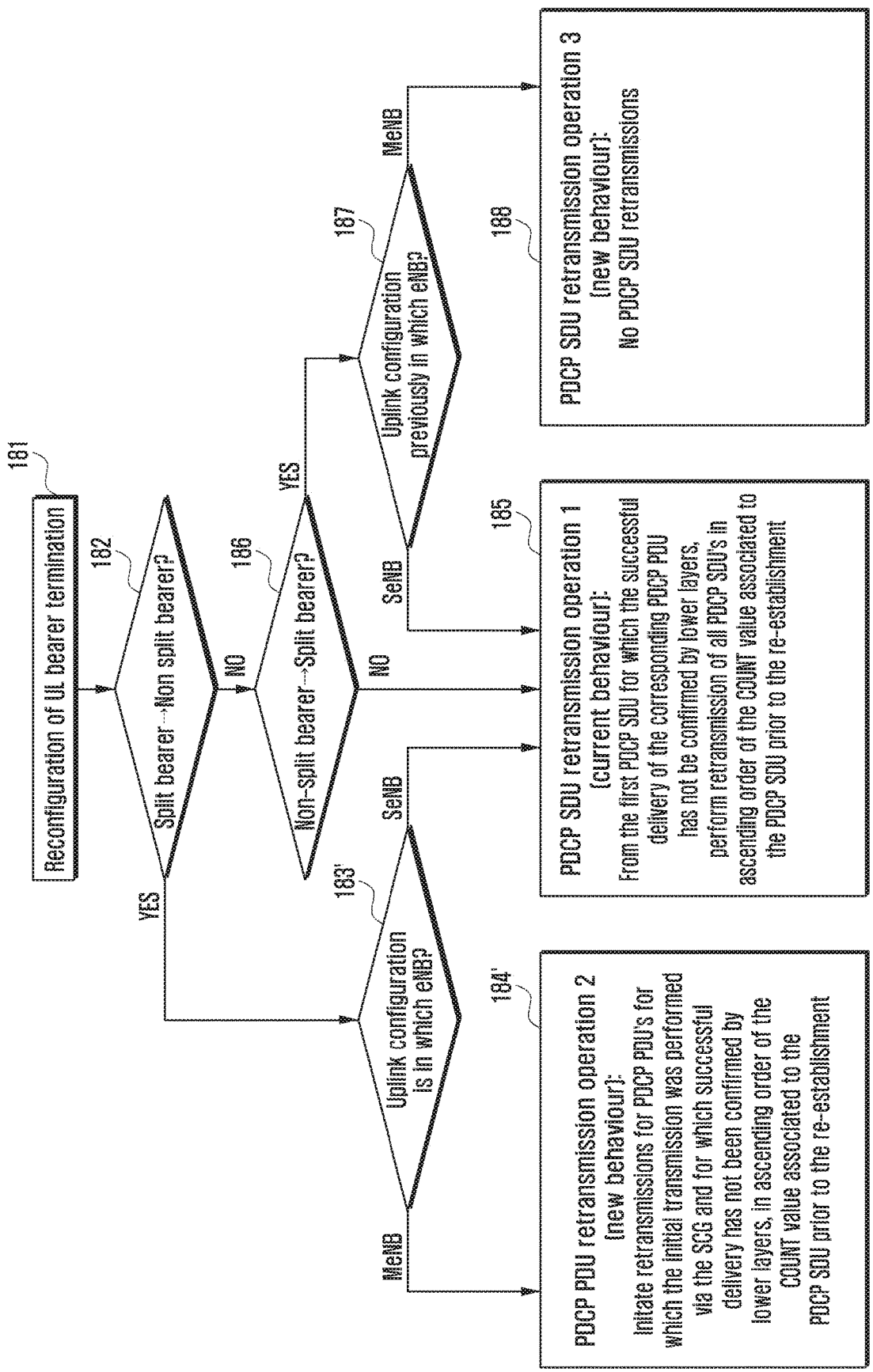

METHOD AND APPARATUS FOR RECONFIGURING A BEARER

CROSS-REFERENCE TO RELATED APPLICATION(S)

This application is a continuation application of prior application Ser. No. 15/033,477, filed on Apr. 29, 2016, which was a U.S. National Stage Application under 35 U.S.C. § 371 of number PCT/KR2014/010334, filed on Oct. 31, 2014, and was based on and claimed priority under 35 U.S.C § 119(a) of Great Britain Patent application 1413854.9, filed on Aug. 5, 2014, Great Britain Patent application 1408072.5, filed on May 7, 2014, and Great Britain Patent application 1319312.3, filed on Nov. 1, 2013, the entire disclosures of each of which is hereby incorporated by reference herein in its entirety.

BACKGROUND

1. Field

The present invention relates to bearer reconfiguration. In particular, certain embodiments of the present invention relate to reconfiguration of a split bearer to a non-split bearer, or vice versa, in a 3rd Generation Partnership Project (3GPP) Long Term Evolution (LTE) or LTE Advanced compliant mobile communications network comprising a mobile terminal (also referred to herein as the User Equipment, UE) and network equipment. The present invention relates to determining which Packet Data Convergence Protocol, PDCP, Service Data Units (SDUs) or Protocol Data Units (PDUs) the UE should retransmit following bearer reconfiguration.

2. Description of Related Art

Wireless or mobile (cellular) communications networks in which a mobile terminal (UE, such as a mobile handset) communicates via a radio link to a network of base stations (eNBs) or other wireless access points connected to a telecommunications network, have undergone rapid development through a number of generations. The initial deployment of systems using analogue signalling has been superseded by Second Generation (2G) digital systems such as Global System for Mobile communications (GSM), which typically use a radio access technology known as GSM Enhanced Data rates for GSM Evolution Radio Access Network (GERAN), combined with an improved core network.

Second generation systems have themselves been largely replaced by or augmented by Third Generation (3G) digital systems such as the Universal Mobile Telecommunications System (UMTS), which uses a Universal Terrestrial Radio Access Network (UTRAN) radio access technology and a similar core network to GSM. UMTS is specified in standards produced by 3GPP. Third generation standards provide for a greater throughput of data than is provided by second generation systems. This trend is continued with the move towards Fourth Generation (4G) systems.

3GPP design, specify and standardise technologies for mobile wireless communications networks. Specifically, 3GPP produces a series of Technical Reports (TR) and Technical Specifications (TS) that define 3GPP technologies. The focus of 3GPP is currently the specification of standards beyond 3G, and in particular an Evolved Packet System (EPS) offering enhancements over 3G networks, including higher data rates. The set of specifications for the EPS comprises two work items: Systems Architecture Evolution (SAE, concerning the core network) and LTE concerning the air interface. The first set of EPS specifications were released as 3GPP Release 8 in December 2008. LTE uses an improved radio access technology known as Evolved UTRAN (E-UTRAN), which offers potentially greater capacity and additional features compared with previous standards. SAE provides an improved core network technology referred to as the Evolved Packet Core (EPC). Despite LTE strictly referring only to the air interface, LTE is commonly used to refer to the whole of the EPS, including by 3GPP themselves. LTE is used in this sense in the remainder of this specification, including when referring to LTE enhancements, such as LTE Advanced. LTE is an evolution of UMTS and shares certain high level components and protocols with UMTS. LTE Advanced offers still higher data rates compared to LTE and is defined by 3GPP standards releases from 3GPP Release 10 up to and including 3GPP Release 12. LTE Advanced is considered to be a 4G mobile communication system by the International Telecommunication Union (ITU).

The present invention is implemented within an LTE mobile network. Therefore, an overview of an LTE network is shown in FIG. 1. The LTE system comprises three high level components: at least one UE 102, the E-UTRAN 104 and the EPC 106. The EPC 106 communicates with Packet Data Networks (PDNs) and servers 108 in the outside world. FIG. 1 shows the key component parts of the EPC 106. It will be appreciated that FIG. 1 is a simplification and a typical implementation of LTE will include further components. In FIG. 1 interfaces between different parts of the LTE system are shown. The double ended arrow indicates the air interface between the UE 102 and the E-UTRAN 104. For the remaining interfaces user data is represented by solid lines and signalling is represented by dashed lines.

The E-UTRAN 104 comprises a single type of component: an eNB (E-UTRAN Node B) which is responsible for handling radio communications between the UE 102 and the EPC 106 across the air interface. An eNB controls UEs 102 in one or more cell. LTE is a cellular system in which the eNBs provide coverage over one or more cells. Typically there is a plurality of eNBs within an LTE system. In general, a UE in LTE communicates with one eNB through one cell at a time.

Key components of the EPC 106 are shown in FIG. 1. It will be appreciated that in an LTE network there may be more than one of each component according to the number of UEs 102, the geographical area of the network and the volume of data to be transported across the network. Data traffic is passed between each eNB and a corresponding Serving Gateway (S-GW) 110 which routes data between the eNB and a PDN Gateway (P-GW) 112. The P-GW 112 is responsible for connecting a UE to one or more servers or PDNs 108 in the outside world. The Mobility Management Entity (MME) 114 controls the high-level operation of the UE 102 through signalling messages exchanged with the UE 102 through the E-UTRAN 104. Each UE is registered with a single MME. There is no direct signalling pathway between the MME 114 and the UE 102 (communication with the UE 102 being across the air interface via the E-UTRAN 104). Signalling messages between the MME 114 and the UE 102 comprise EPS Session Management (ESM) protocol messages controlling the flow of data from the UE to the outside world and EPS Mobility Management (EMM) protocol messages controlling the rerouting of signalling and data flows when the UE 102 moves between eNBs within the E-UTRAN. The MME 114 exchanges signalling traffic with the S-GW 110 to assist with routing data traffic. The MME 114 also communicates with a Home Subscriber Server (HSS) 116 which stores information about users registered with the network.

Within an LTE network, data is transferred between different components of the network using bearers. An EPS bearer serves to transfer data between a UE and a P-GW. The data flow is bi-directional. Data carried by an EPS bearer comprises one or more service data flows carrying data for a particular service, for instance streamed media. Each service data flow comprises one or more packet flows.

3GPP Radio Access Network (RAN) workgroups are current working on a Study Item (SI) called "Small Cell Enhancements". The technical outcome of this SI is documented in 3GPP TR 36.842 "Evolved Universal Terrestrial Radio Access (E-UTRA)"; Study on Small Cell enhancements for E-UTRA and E-UTRAN ? Higher layer aspects (Release 12); c0.0. 3GPP TR 36.842 concerns the radio access aspects of the SI and impacts upon both the UE and the eNB. Small cell enhancements are applicable, for instance, where there is a macro cell and a small cell (within the coverage area of the macro cell) operating on the same carrier frequency.

It is currently proposed that the RAN will support so called "dual connectivity" functionality. Dual connectivity refers to an operation where a given UE consumes radio resources provided by at least two different network points (Master and Secondary eNBs) connected with non-ideal backhaul while the UE is active within the network (in an RRC_CONNECTED (Radio Resource Control Connected) state. Dual connectivity permits a greater data rate to be achieved between the UE and the RAN. To achieve dual connectivity, it is proposed that the RAN will support "bearer split" functionality. In dual connectivity, bearer split refers to the ability to split a bearer over multiple eNBs. A Master eNB (MeNB, usually the macro cell eNB) is the eNB which terminates at least S1-MME interface (the interface between the eNB and the MME) and therefore act as mobility anchor towards the Core Network (CN). A Secondary eNB (SeNB, usually the eNB handling small cells) is an eNB providing additional radio resources for the UE, which is not the MeNB.

Referring to FIG. 2, this shows option 3 of FIG. 8.1.1-1 of TS 36.842, which illustrates one bearer split option, taking the downlink direction as an example. It can be seen that there is a first EPS bearer (#1: solid arrows) communicating directly from a P-GW (not shown) via the S-GW and the MeNB to the UE. A second EPS bearer (#2: dashed arrows) passes from the MeNB to the UE via the SeNB as well as directly between the MeNB and the UE. The second EPS bearer is split across the RAN.

To achieve a split bearer it is necessary to modify the existing user plane architecture shown in FIG. 6-1 of 3GPP TS 36.300 "Evolved Universal Terrestrial Radio Access (E-UTRA) and Evolved Universal Terrestrial Radio Access Network (E-UTRAN)"; Overall description; Stage 2 (Release 11); v11.7.0 (not reproduced in the present specification). At an eNB, for communicating with the UE across the air interface, the eNB comprises a protocol stack having a PDCP layer, a Radio Link Control (RLC) layer and a Medium Access Control (MAC) layer. Collectively, these protocol layers form the data link layer: layer two of the standard Open Systems Interconnection (OSI) model. The MAC layer carries out low-level control of the physical layer (layer 1 of the OSI model, and outside of the scope of the present specification), including scheduling data transmissions between the mobile and the base station. The RLC layer maintains the data link between the UE and the eNB, and handles the acknowledgement of receipt of data packets, when required. The PDCP layer carries out higher-level transport functions including header compression and security. At each layer of the protocol stack the protocol receives a data packet from the protocol above in the form of a Service Data Unit (SDU), processes the packets and adds a header to form a Protocol Data Unit (PDU). The PDU becomes the incoming SDU of the next layer down the stack.

In a bearer split architecture such as is shown in FIG. 2 the layer 2 protocol stack at the eNB is split between the MeNB and the SeNB. Specifically, a split radio bearer uses two RLC entities as shown in FIG. 3, which reproduces FIG. 8.1.1.8-1 from 3GPP TR 36.842. FIG. 3 shows a first non-split bearer protocol stack at the MeNB (solid boxes). FIG. 3 shows data being received from the S-GW across the S1 interface. FIG. 3 further shows a second split radio bearer (dashed boxes and dashed arrows). For the split bearer there is a single PDCP entity at the MeNB and duplicated RLC/MAC protocol stack entities for the split bearer in both the MeNB and the SeNB. Data is sent between the single PDCP entity in the MeNB and the RCL/MAC entities in the SeNB across the Xn interface (alternatively referred to as the X2 interface). Although not shown in FIG. 3, at the UE side there would be corresponding MAC/RLC/PDCP entities, and specifically a single UE PDCP entity and duplicated UE MAC/RLC entities.

SUMMARY

Technical Problem

In certain scenarios, part or the whole of the radio bearer protocol stack may be moved from one termination point to another termination point, for instance from one eNB to another eNB. For non-split radio bearers this may be due to the UE roaming between cells controlled by separate eNBs. In this case some of the on-going transmissions in the discontinued user plane stack will be terminated before successful delivery of the corresponding PDCP SDUs has been ensured. To overcome the loss that would be the result of this termination, PDCP SDU retransmissions may be initiated after the radio bearer protocol stack move. So far, 3GPP RAN2 specifications have only specified how PDCP SDU retransmissions are handled for non-split bearers (that is, how PDCP SDU retransmissions are to be handled when the complete RAN protocol stack is moved). If it is required to reconfigure a split bearer as a non-split bearer, for instance due to the UE moving out of the coverage area of the small cell, while remaining in the coverage area of the macro cell, then this also requires at least the part of the radio bearer protocol stack within the SeNB to be moved. Applying the same retransmission techniques when reconfiguring a split bearer to a non-split bearer will lead to inefficient retransmission, as is described in greater detail below.

Solution to Problem

According to a first aspect of the present invention there is provided a data transmission method of a User Equipment, UE, in a Long Term Evolution, LTE, compliant mobile communications network, the method comprising: detecting reconfiguration of a bearer from a split bearer in which uplink Packet Data Convergence Protocol, PDCP, Protocol Data Units, PDUs, are transmitted to both a Master eNB, MeNB, and to a Secondary eNB, SeNB, to a non-split bearer in which uplink PDCP PDUs are transmitted only to the MeNB; and if reconfiguration of a bearer from a split bearer to a non-split bearer in which uplink PDCP PDUs are transmitted to the MeNB is detected: initiating retransmission of PDCP PDUs for which transmission was attempted via the SeNB; and retransmitting only PDCP PDUs for which there has been no confirmation of successful delivery by a protocol layer below the PDCP layer within the UE The retransmission of PDCP PDUs may be in ascending order of count values assigned to the PDCP PDUs prior to the reconfiguration of the bearer.

The method may further comprise: receiving a PDCP status report from the MeNB; and determining that for PDCP Service Data Units, SDUs, that are indicated in the PDCP status report as received, the corresponding PDCP PDUs need not be retransmitted.

The UE may be configured to use only bearers for which successful delivery of PDCP PDUs is acknowledged by the eNB at a protocol layer below the PDCP layer.

The UE may be configured to use only bearers using Radio Link Control Acknowledged Mode, RLC-Acknowledged Mode.

Successful delivery of a PDCP PDU may be confirmed by the Radio Link Control, RLC, layer or the Medium Access Control, MAC, layer.

The method may further comprise: detecting reconfiguration of a bearer from a split bearer in which uplink PDCP PDUs are transmitted to both a Master eNB, MeNB, and to a Secondary eNB, SeNB, to a non-split bearer in which uplink PDCP PDUs are transmitted to the SeNB; and if reconfiguration of a bearer from a split bearer to a non-split bearer in which uplink PDCP PDUs are transmitted only to the SeNB is detected: initiating retransmission of PDCP SDUs from the first PDCP SDU for which there is no confirmation of successful delivery of a corresponding PDCP PDU by a protocol layer below the PDCP layer within the UE; and retransmitting all PDCP SDUs from the first PDCP SDU.

The method may further comprise: detecting reconfiguration of a bearer from a non-split bearer to split bearer; and if reconfiguration of a bearer from a non-split bearer to a split bearer is detected: determining whether, before reconfiguration of the bearer from a non-split bearer to a split bearer, PDCP PDUs were transmitted to the MeNB or the SeNB; wherein if it is determined that PDCP transmissions were transmitted to the MeNB then the method further comprises determining that no PDCP SDU or PDCP PDU retransmissions are required.

If it is determined that PDCP transmissions were transmitted to the SeNB then the method may further comprise: initiating retransmission of PDCP SDUs from the first PDCP SDU for which there is no confirmation of successful delivery of a corresponding PDCP PDU by a protocol layer below the PDCP layer within the UE; and retransmitting all PDCP SDUs from the first PDCP SDU.

The method may further comprise: detecting reconfiguration of a bearer from a split bearer in which uplink PDCP PDUs are transmitted to only one of a MeNB and a SeNB to a non-split bearer in which uplink PDCP PDUs are transmitted to the MeNB; determining whether before reconfiguration PDCP PDU transmissions from the UE were restricted to transmissions to just the MeNB or just the SeNB; wherein if it is determined that PDCP PDU transmissions from the UE were restricted to transmissions to just the MeNB then the method further comprises determining that no PDCP SDU or PDCP PDU retransmissions are required; and wherein if it is determined that PDCP PDU transmissions from the UE were restricted to transmissions to just the SeNB then the method further comprises: initiating retransmission of PDCP PDUs; and retransmitting only PDCP PDUs for which there is no confirmation of successful delivery by a protocol layer below the PDCP layer within the UE.

The method may further comprise: detecting reconfiguration of a bearer from a split bearer in which uplink PDCP PDUs are transmitted to only one of a MeNB and a SeNB to a non-split bearer in which uplink PDCP PDUs are transmitted to the MeNB; and if reconfiguration of a bearer from a split bearer in which uplink PDCP PDUs are transmitted to only one of a MeNB and a SeNB to a non-split bearer in which uplink PDCP PDUs are transmitted to the MeNB is detected: initiating retransmission of PDCP PDUs for which transmission was attempted via the SeNB; and retransmitting only PDCP PDUs for which there has been no confirmation of successful delivery by a protocol layer below the PDCP layer within the UE.

According to a second aspect of the present invention there is provided a data transmission method of a User Equipment, UE, in a Long Term Evolution, LTE, compliant mobile communications network, the method comprising: detecting reconfiguration of a bearer from a split bearer in which uplink PDCP PDUs are transmitted to only one of a MeNB and a SeNB to a non-split bearer in which uplink PDCP PDUs are transmitted to the MeNB; determining whether before reconfiguration PDCP PDU transmissions from the UE were restricted to transmissions to just the MeNB or just the SeNB; wherein if it is determined that PDCP PDU transmissions from the UE were restricted to transmissions to just the MeNB then the method further comprises determining that no PDCP SDU or PDCP PDU retransmissions are required.

According to a third aspect of the present invention there is provided a data transmission method of a User Equipment, UE, in a Long Term Evolution, LTE, compliant mobile communications network, the method comprising: detecting reconfiguration of a bearer from a split bearer in which uplink PDCP PDUs are transmitted to only one of a MeNB and a SeNB to a non-split bearer in which uplink PDCP PDUs are transmitted to the MeNB; determining whether before reconfiguration PDCP PDU transmissions from the UE were restricted to transmissions to just the MeNB or just the SeNB; wherein if it is determined that PDCP PDU transmissions from the UE were restricted to transmissions to just the SeNB then the method further comprises: initiating retransmission of PDCP PDUs; and retransmitting only PDCP PDUs for which there is no confirmation of successful delivery by a protocol layer below the PDCP layer within the UE.

According to a fourth aspect of the present invention there is provided a data transmission method of a User Equipment, UE, in a Long Term Evolution, LTE, compliant mobile communications network, the method comprising: detecting reconfiguration of a bearer from a split bearer in which uplink PDCP PDUs are transmitted to only one of a MeNB and a SeNB to a non-split bearer in which uplink PDCP PDUs are transmitted to the MeNB; and if reconfiguration of a bearer from a split bearer in which uplink PDCP PDUs are transmitted to only one of a MeNB and a SeNB to a non-split bearer in which uplink PDCP PDUs are transmitted to the MeNB is detected: initiating retransmission of PDCP PDUs for which transmission was attempted via the SeNB; and retransmitting only PDCP PDUs for which there has been no confirmation of successful delivery by a protocol layer below the PDCP layer within the UE.

Retransmission of PDCP PDUs may form part of a partial PDCP re-establishment procedure; wherein the partial PDCP re-establishment procedure further comprises at the UE for the uplink: not resetting header compression; and not resetting the ciphering key; and wherein the partial PDCP re-establishment procedure further comprises at the UE for the downlink: processing all received PDCP PDUs; not resetting header compression; not resetting the ciphering key; and transmitting a PDCP status report.

The partial PDCP re-establishment procedure may be triggered in response to one of: detecting at the UE reconfiguration of a bearer from a split bearer to a non-split bearer in which uplink PDCP PDUs are transmitted to the MeNB; detecting at the UE reconfiguration of a bearer from a first split bearer to a second split bearer in which the MeNB remains the same and the SeNB changes; and receiving an indicator from the network indicating that partial PDCP re-establishment is to be performed.

According to a fifth aspect of the present invention there is provided a User Equipment, UE, in a Long Term Evolution, LTE, compliant mobile communications network, wherein the UE is arranged to: detect reconfiguration of a bearer from a split bearer in which uplink Packet Data Convergence Protocol, PDCP, Protocol Data Units, PDUs, are transmitted to both a Master eNB, MeNB, and to a Secondary eNB, SeNB, to a non-split bearer in which uplink PDCP PDUs are transmitted only to the MeNB; if reconfiguration of a bearer from a split bearer to a non-split bearer in which uplink PDCP PDUs are transmitted to the MeNB is detected, initiate retransmission of PDCP PDUs for which transmission was attempted via the SeNB; and retransmit only PDCP PDUs for which there has been no confirmation of successful delivery by a protocol layer below the PDCP layer within the UE.

The UE may be further arranged to implement any of the above methods.

According to a sixth aspect of the present invention there is provided a User Equipment, UE, in a Long Term Evolution, LTE, compliant mobile communications network, wherein the UE is arranged to: detect reconfiguration of a bearer from a split bearer in which uplink PDCP PDUs are transmitted to only one of a MeNB and a SeNB to a non-split bearer in which uplink PDCP PDUs are transmitted to the MeNB; determine whether before reconfiguration PDCP PDU transmissions from the UE were restricted to transmissions to just the MeNB or just the SeNB; wherein if it is determined that PDCP PDU transmissions from the UE were restricted to transmissions to just the MeNB then the method further comprises determine that no PDCP SDU or PDCP PDU retransmissions are required.

According to a seventh aspect of the present invention there is provided a User Equipment, UE, in a Long Term Evolution, LTE, compliant mobile communications network, wherein the UE is arranged to: detect reconfiguration of a bearer from a split bearer in which uplink PDCP PDUs are transmitted to only one of a MeNB and a SeNB to a non-split bearer in which uplink PDCP PDUs are transmitted to the MeNB; determine whether before reconfiguration PDCP PDU transmissions from the UE were restricted to transmissions to just the MeNB or just the SeNB; wherein if it is determined that PDCP PDU transmissions from the UE were restricted to transmissions to just the SeNB then the method further comprises: initiate retransmission of PDCP PDUs; and retransmit only PDCP PDUs for which there is no confirmation of successful delivery by a protocol layer below the PDCP layer within the UE.

According to an eighth aspect of the present invention there is provided a User Equipment, UE, in a Long Term Evolution, LTE, compliant mobile communications network, wherein the UE is arranged to: detect reconfiguration of a bearer from a split bearer in which uplink PDCP PDUs are transmitted to only one of a MeNB and a SeNB to a non-split bearer in which uplink PDCP PDUs are transmitted to the MeNB; and if reconfiguration of a bearer from a split bearer in which uplink PDCP PDUs are transmitted to only one of a MeNB and a SeNB to a non-split bearer in which uplink PDCP PDUs are transmitted to the MeNB is detected: initiate retransmission of PDCP PDUs for which transmission was attempted via the SeNB; and retransmit only PDCP PDUs for which there has been no confirmation of successful delivery by a protocol layer below the PDCP layer within the UE.

The UE may be further arranged to retransmit PDCP PDUs as part of a partial PDCP re-establishment procedure; wherein the partial PDCP re-establishment procedure further comprises for the uplink the UE being further arranged to: not reset header compression; and not reset the ciphering key; and wherein the partial PDCP re-establishment procedure further comprises for the downlink the UE being further arranged to: process all received PDCP PDUs; not reset header compression; not reset the ciphering key; and transmit a PDCP status report.

The UE may be further arranged to trigger the partial PDCP re-establishment procedure in response to one of: detecting at the UE reconfiguration of a bearer from a split bearer to a non-split bearer in which uplink PDCP PDUs are transmitted to the MeNB; detecting at the UE reconfiguration of a bearer from a first split bearer to a second split bearer in which the MeNB remains the same and the SeNB changes; and receiving an indicator from the network indicating that partial PDCP re-establishment is to be performed.

There is further disclosed a data transmission method of a User Equipment, UE, in a Long Term Evolution, LTE, compliant mobile communications network, the method comprising: detecting reconfiguration of a bearer from a split bearer in which uplink Packet Data Convergence Protocol, PDCP, Protocol Data Units, PDUs, are transmitted to both a Master eNB, MeNB, and to a Secondary eNB, SeNB, to non-split bearer in which uplink PDCP PDUs are transmitted only to the MeNB; and if reconfiguration of a bearer from a split bearer to a non-split bearer is detected: initiating retransmission of PDCP Service Data Units, SDUs, from the first PDCP SDU for which transmission of the corresponding PDCP PDU was attempted via the SeNB and for which there has been no confirmation of successful delivery by a protocol layer below the PDCP layer within the UE; and retransmitting only PDCP SDUs for which transmission of the corresponding PDCP PDU was attempted via the SeNB.

The retransmission of PDCP SDUs may be in ascending order of count values assigned to the PDCP SDUs prior to the reconfiguration of the bearer.

The method may further comprise: receiving a PDCP status report from the MeNB; and determining that PDCP SDUs that are indicated in the PDCP status report as received need not be retransmitted.

The UE may be configured to use only bearers for which successful delivery of PDCP PDUs is acknowledged by the eNB at a protocol layer below the PDCP layer.

The UE may be configured to use only bearers using Radio Link Control Acknowledged Mode, RLC-Acknowledged Mode.

Successful delivery of a PDCP PDU may be confirmed by the Radio Link Control, RLC, layer or the Medium Access Control, MAC, layer.

The method may further comprise: determining whether, following reconfiguration of the bearer from a split bearer to a non-split bearer, PDCP transmissions are to be terminated within the MeNB or the SeNB; wherein the steps of initiating retransmission of PDCP SDUs from the first PDCP SDU for which transmission of the corresponding PDCP PDU was attempted via the SeNB and for which there has been no confirmation of successful delivery by a protocol layer below the PDCP layer within the UE, and retransmitting only PDCP SDUs for which transmission of the corresponding PDCP PDU was attempted via the SeNB are only performed if it is determined that PDCP transmissions are to be terminated within the MeNB.

If it is determined that PDCP transmissions are to be terminated within the SeNB then the method may further comprise: retransmitting of PDCP SDUs from the first PDCP SDU for which there is no confirmation of successful delivery of a corresponding PDCP PDU by a protocol layer below the PDCP layer within the UE; and retransmitting all PDCP SDUs from the first PDCP SDU.

The method may further comprise: detecting reconfiguration of a bearer from a non-split bearer to split bearer; and if reconfiguration of a bearer from a non-split bearer to a split bearer is detected: determining whether, before reconfiguration of the bearer from a split bearer to a non-split bearer, PDCP transmission were terminated within the MeNB or the SeNB; wherein if it is determined that PDCP transmissions were terminated within the MeNB then the method further comprises determining that no PDCP SDU retransmissions are required.

If it is determined that PDCP transmissions were terminated within the SeNB then the method further comprises: retransmitting PDCP SDUs from the first PDCP SDU for which there is no confirmation of successful delivery of a corresponding PDCP PDU by a protocol layer below the PDCP layer within the UE; and retransmitting all PDCP SDUs from the first PDCP SDU.

If reconfiguration of a bearer from a split bearer to a non-split bearer is detected, the method may further comprise: determining whether before reconfiguration PDCP SDU transmissions from the UE were restricted to transmissions to just the MeNB or just the SeNB; wherein if it is determined whether PDCP SDU transmissions from the UE were restricted to transmissions to just the MeNB then the method further comprises determining that no PDCP SDU retransmissions are required; and wherein if it is determined whether PDCP SDU transmissions from the UE were restricted to transmissions to just the MeNB then the method further comprises: retransmitting PDCP SDUs from the first PDCP SDU for which there is no confirmation of successful delivery of a corresponding PDCP PDU by a protocol layer below the PDCP layer within the UE; and retransmitting all PDCP SDUs from the first PDCP SDU.

There is further disclosed a User Equipment, UE, in a Long Term Evolution, LTE, compliant mobile communications network, wherein the UE is arranged to: detect reconfiguration of a bearer from a split bearer in which uplink Packet Data Convergence Protocol, PDCP, Protocol Data Units, PDUs, are transmitted to both a Master eNB, MeNB, and to a Secondary eNB, SeNB, to non-split bearer in which uplink PDCP PDUs are transmitted only to the MeNB; if reconfiguration of a bearer from a split bearer to a non-split bearer is detected, initiate retransmission of PDCP Service Data Units, SDUs, from the first PDCP SDU for which transmission of the corresponding PDCP PDU was attempted via the SeNB and for which there has been no confirmation of successful delivery by a protocol layer below the PDCP layer within the UE; and retransmit only PDCP SDUs for which transmission of the corresponding PDCP PDU was attempted via the SeNB.

The UE may be further arranged to implement the above described method.

Another aspect of the invention provides a computer program comprising instructions arranged, when executed, to implement a method and/or apparatus in accordance with any one of the above-described aspects. A further aspect provides machine-readable storage storing such a program.

Advantageous Effects of Invention

It is an aim of certain embodiments of the present invention to improve the efficiency of data retransmission when reconfiguring a split bearer as a non-split bearer. Certain embodiments relate specifically to retransmission of data from the UE to the network. Certain embodiments of the present invention are specifically concerned with the case that a split bearer is reconfigured to a non-split bearer while keeping the same PDCP entity in the network. In this case the part of the user plane stack in the SeNB is terminated and transmissions on-going in that part may be lost. Certain embodiments of the invention are concerned specifically with bearers configured for reliable transport, for instance using RLC-Acknowledged Mode. In RLC-Acknowledged Mode the transmitter sends PDUs and stores the PDUs in a retransmission buffer until an acknowledgement of receipt is received. The transmitter regularly polls the receiver to return a status PDU listing the received PDUs. The transmitter may then delete the received PDUs from the buffer and re-transmit the remaining PDUs.

BRIEF DESCRIPTION OF DRAWINGS

Embodiments of the invention are further described hereinafter with reference to the accompanying drawings, in which:

FIG. 5 illustrates the format of a PDCP status report;

FIG. 21 is a further flowchart illustrating a method of reconfiguring a bearer.

DETAILED DESCRIPTION

Embodiments of the invention will now be described in the context of an LTE compliant mobile wireless communications network operating in accordance with the 3GPP LTE standards up to Release-12 and beyond. However, it will be understood that this is by way of example only and that other embodiments may involve other wireless networks, operating at least partially in compliance with other releases and other standards.

Figure 4:
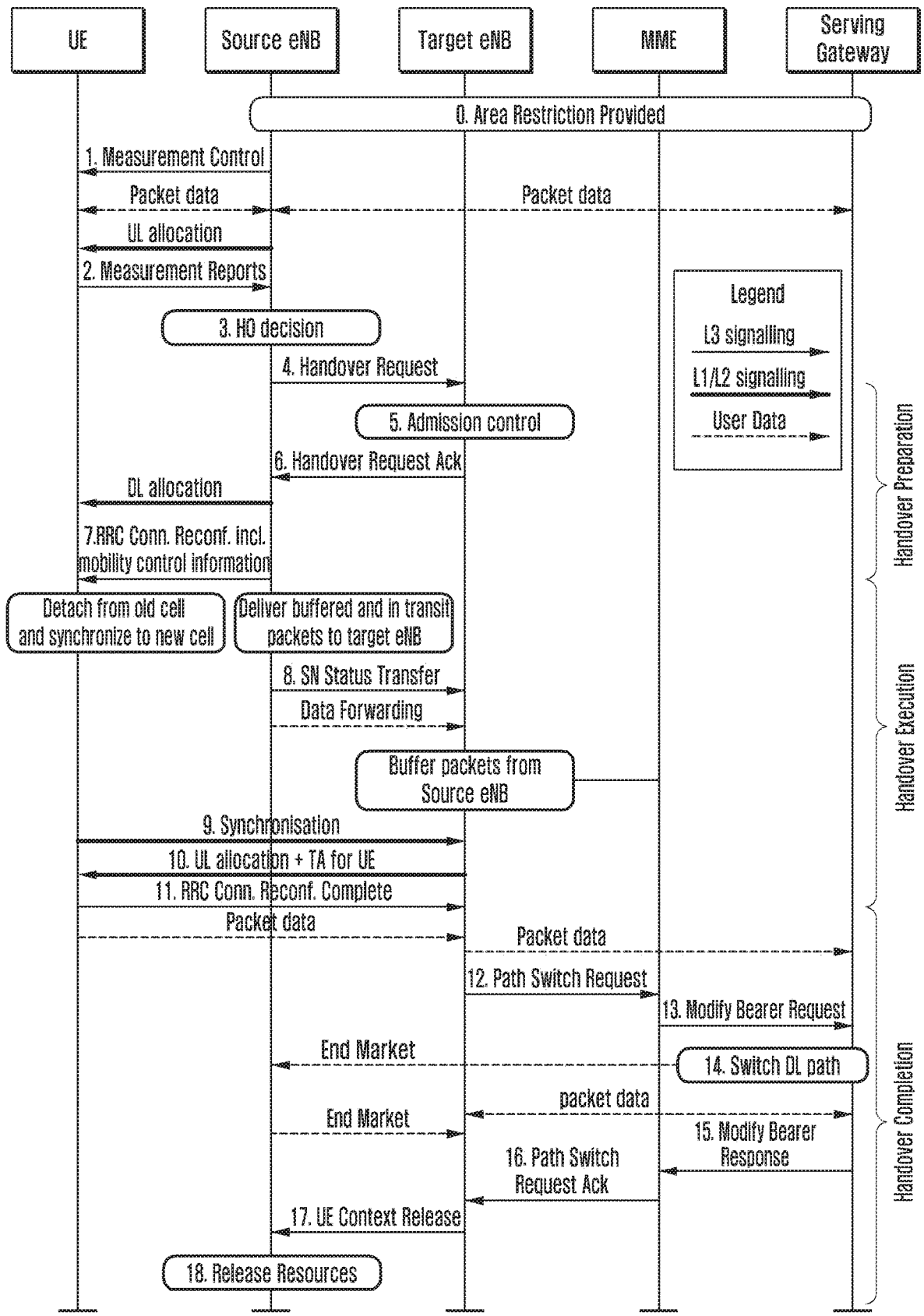
FIG. 4 illustrates a message flow during an X2 handover of a non-split bearer between a source eNB and a target eNB.
Figure 10:
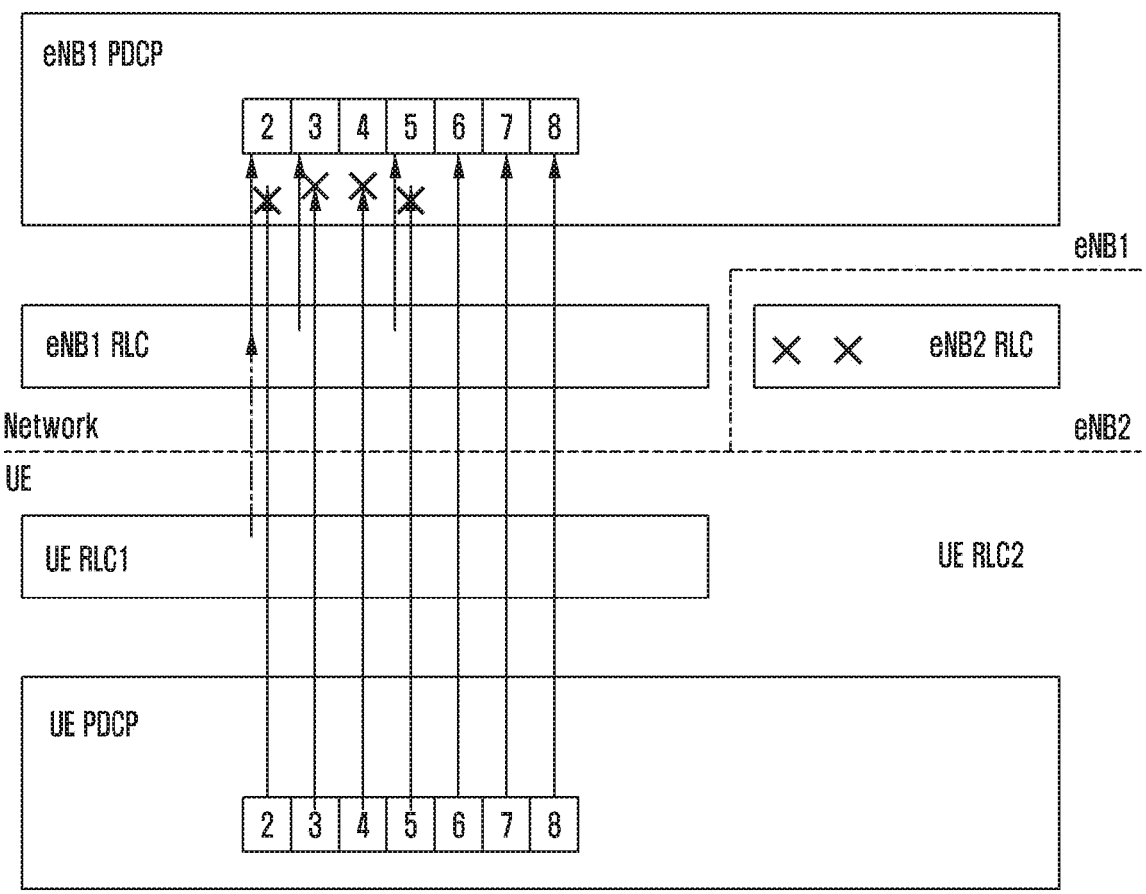
FIGS. 10 to 15 illustrate PDCP SDU retransmissions for the delivery situation of FIG. 9 following reconfiguration to a non-split bearer, according to a first to fifth options.

Referring to FIG. 4, this shows the message sequence chart for an "X2 handover" from 3GPP TS 36.300 (FIG. 10.1.2.1.1-1). Specifically, this shows an X2 handover of a UE in RRC_CONNECTED mode in which a non-split bearer is reconfigured such that it is terminated at a target eNB in place of a source eNB. At steps 1 to 3 the source eNB determines whether to handover. Steps 4 to 7 concern handover preparation during which the source eNB passes all necessary information to the target eNB for effecting the handover. Steps 8 to 11 comprise handover execution. Steps 12 to 18 comprise handover execution. A more detailed explanation of FIG. 4 is provided in section 10.1.2.1.1 of 3GPP TS 36.300, but is not needed for explanation of the present invention.

In the context of the present invention a first key step is the "Data Forwarding" of user data from the source eNB to the target eNB after step 8 (during handover execution). Importantly, it is at the discretion of the source eNB whether or not uplink PDCP SDUs that are received out of sequence are forwarded to the target eNB. As a first option, the source eNB may discard all such out of sequence PDCP SDUs and rely on the UE retransmitting all PDCP SDU's from the first non-delivered PDCP SDU to the target eNB. Alternatively, as a second option the source eNB may forward all such out of sequence PDCP SDUs and ask the UE to only retransmit the missing PDCP SDUs to the target eNB.

This behaviour is captured in 3GPP TS 36.300 section 10.1.2.3.1:

Then the source eNB shall either:

discard the uplink PDCP SDUs received out of sequence if the source eNB has not accepted the request from the target eNB for uplink forwarding or if the target eNB has not requested uplink forwarding for the bearer during the Handover Preparation procedure, forward to the target eNB the uplink PDCP SDUs received out of sequence if the source eNB has accepted the request from the target eNB for uplink forwarding for the bearer during the Handover Preparation procedure.

As further set out in 3GPP TS 36.300 section 10.1.2.3.1, the source eNB is further responsible for forwarding unacknowledged downlink PDCP SDUs to the target eNB and forwarding successively received uplink PDCP SDUs to the S-GW though this is outside of the scope of the present specification.

This optional behaviour for handling out of sequence uplink PDCP SDUs has consequences for later steps in FIG. 4. A second key step is the "packet data" delivery of user data between the UE and the target eNB after step 11. The UE retransmits all PDCP SDUs for which successful delivery of corresponding PDCP PDU has not been confirmed by lower layers as documented in 3GPP TS 36.323 "Evolved Universal Terrestrial Radio Access (E-UTRA)"; Packet Data Convergence Protocol (PDCP) specification (Release 11); v11.2.0 section 5.2.1.1:

from the first PDCP SDU for which the successful delivery of the corresponding PDCP PDU has not been confirmed by lower layers, perform retransmission or transmission of all the PDCP SDUs already associated with PDCP SNs in ascending order of the COUNT values associated to the PDCP SDU prior to the PDCP re-establishment as specified below:

//partly omitted// submit the resulting PDCP Data PDU to lower layer.

If the source eNB is configured to the option of not forwarding out of sequence PDCP SDUs, then the retransmission by the UE of all PDCP SDUs from the first PDCP SDU for which there is not lower layer confirmation of successful delivery is fine and no further action is required.

If the source eNB is configured to forward out of sequence received PDCP SDUs to the target eNB, then the specifications allow the target eNB to inform the UE about the already received PDCP SDUs with a PDCP status report as described in 3GPP TS 36.323 section 6.2.6. FIG. 4 does not show a PDCP status report message, though this would be provided after the data forwarding following step 8 and before the packet data transmission following step 11. FIG. 5 reproduces FIG. 6.2.6.1 of 3GPP TS 36.323 and shows the format of a PDCP Control PDU carrying one PDCP status report when a 12 bit sequence number length is used. The field FMS identifies the first missing PDCP serial number. If there are received out of sequence PDCP SDUs then the bitmap field indicates missing PDCP SDUs from the first missing PDCP SDU. The bitmap field is of length in bits equal to the number of PDCP sequence numbers from, but not including the first missing PDCP SDU and up to and including the last received out of sequence PDCP SDU, rounded to the next multiple of 8 bits. For each position in the bitmap a zero indicates a PDCP SDU sequence number which is not reported to have been received by the lower layers. A one in the bitmap indicates a received PDCP SDU.

If the UE receives a PDCP status report, the UE may omit retransmissions of any PDCP SDUs which have been received by the source eNB. This behaviour is documented in section 5.4 of 3GPP TS 36.323:

When the discardTimer expires for a PDCP SDU, or the successful delivery of a PDCP SDU is confirmed by PDCP status report, the UE shall discard the PDCP SDU along with the corresponding PDCP PDU. If the corresponding PDCP PDU has already been submitted to lower layers the discard is indicated to lower layers.

The currently specified solution works fine for an X2 handover when moving a non-split bearer. To illustrate the conventional retransmission of PDCP SDUs from a UE to a target eNB during such a handover, both with and without forwarding by the source PDCP, reference is now made to FIGS. 6 to 8.

Figure 6:
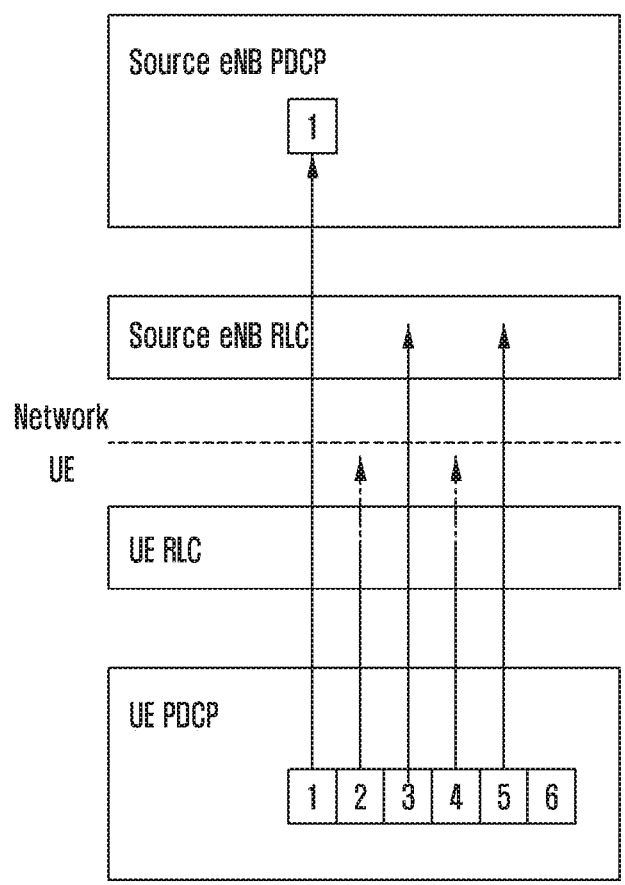
FIG. 6 illustrates the delivery situation for a non-split radio bearer immediately before an X2 handover from a source eNB to a target eNB.

FIG. 6 shows a possible delivery situation for a non-split radio bearer just before an X2 handover. FIG. 6 shows PDCP and RLC entities at both a UE and a source eNB (MAC entities are omitted for clarity). This split between the network and the UE is shown. The UE PDCP entity shows six PDCP PDUs for transmission to the source eNB PDCP entities. In this example, PDCP PDU1 is the last PDCP PDU delivered in sequence to the eNB PDCP entity. PDCP PDUs 2 and 4 failed at during their first transmission at lower layers and will have to be retransmitted by the UE RLC entity. This is indicated by the arrows from those PDUs not reaching across the network line to the source eNB RLC entity. PDUs 3 and 5 have been delivered to the RLC entity at the eNB, but since the RLC entity only delivers PDCP PDU's in sequence to PDCP, these PDCP PDU's are still buffered at the source eNB RLC entity. Receipt of the PDUs 3 and 5 will have been acknowledged by the source eNB RLC entity to the UE RLC entity.

Figure 7:
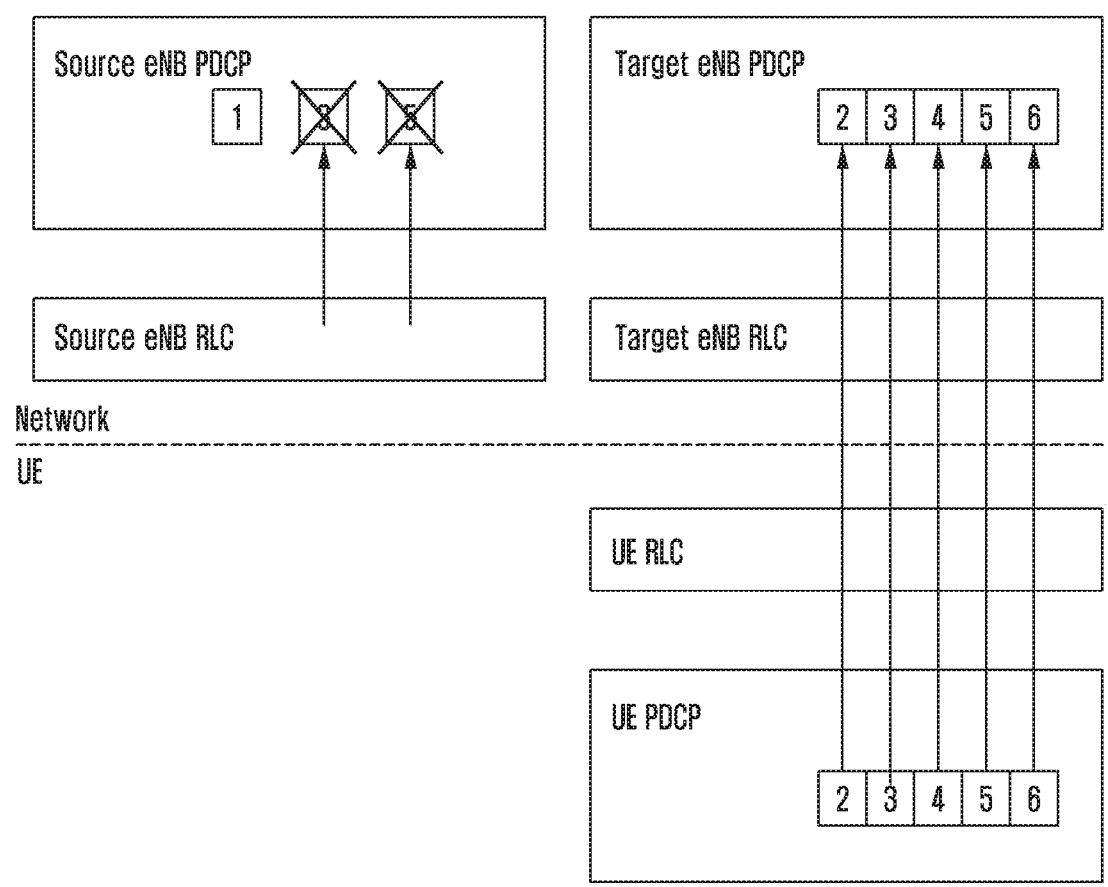
FIG. 7 illustrates PDCP SDU retransmissions for the delivery situation of FIG. 6 upon the X2 handover, according to a first network option.

FIG. 7 shows what happens after X2 handover to a target eNB if the network implements the first option in which the source eNB discards out of sequence SDUs. At handover the source eNB RLC entity delivers out of sequence delivered PDCP PDUs (PDUs 3 and 5) to the PDCP entity due to a re-establishment of the RLC entity in the source eNB. However, the source PDCP entity will discard these PDUs, indicated by PDUs 3 and 5 being crossed out. During handover completion the UE retransmits all PDUs from the first non-delivery-confirmed PDCP PDU (PDCP PDU 2 in this example). Consequently, the UE must retransmit PDCP PDUs 2 to 6 (indicated by the arrows between the UE PDCP entity and the target eNB PDCP entity), even though PDUs 3 and 5 were successfully delivered to the network.

Figure 8:
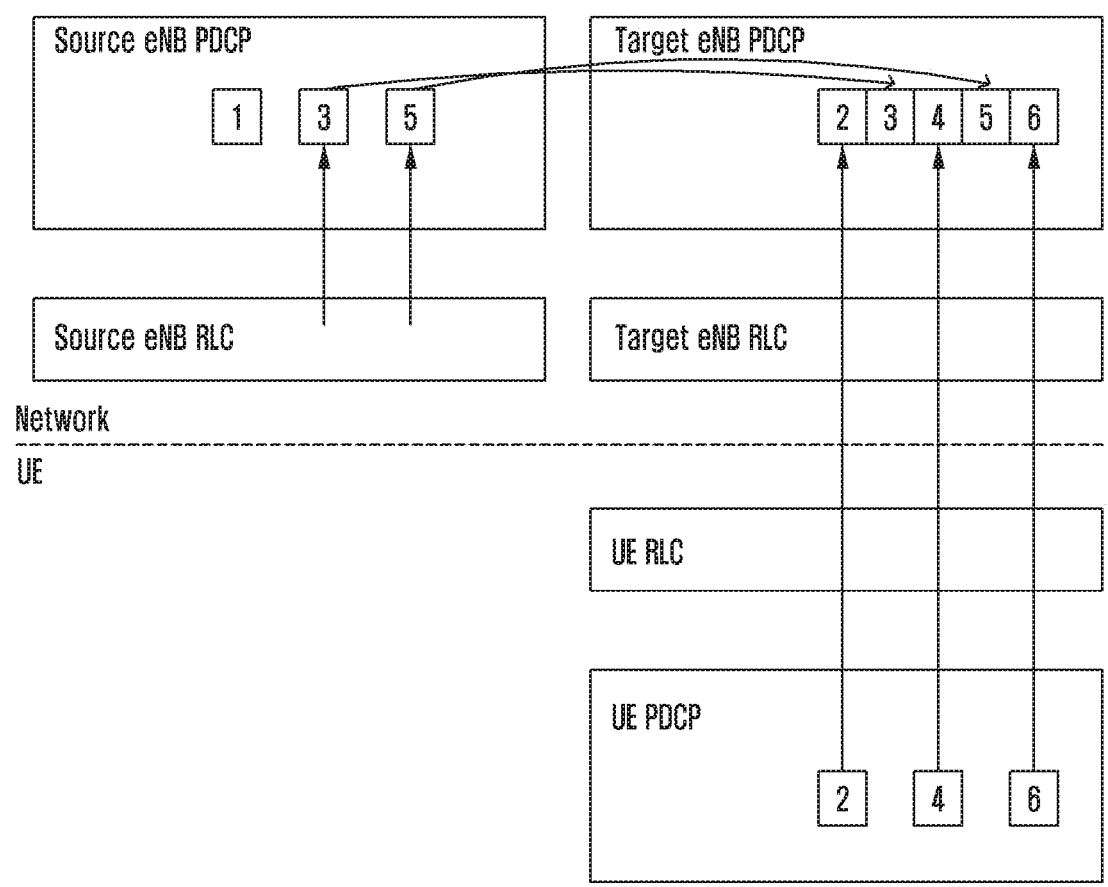
FIG. 8 illustrates PDCP SDU retransmissions for the delivery situation of FIG. 6 upon the X2 handover, according to a second network option.

FIG. 8 shows what happens after X2 handover to a target eNB if the network implements the second option in which the source eNB forwards out of sequence SDUs. Again PDCP PDUs 3 and 5 are delivered to the source eNB PDCP entity due to a re-establishment of the RLC entity in the source eNB. However, this time PDCP PDUs 3 and 5 are forwarded to the target eNB PDCP entity. Based on a PDCP status report as described above in connection with FIG. 5, the UE knows that these PDCP PDUs do not have to be transmitted in the target eNB, thus saving resources in the UE and the target eNB. Consequently, the UE need only retransmit PDCP PDUs 2, 4 and 6 (indicated by the arrows between the UE PDCP entity and the target eNB PDCP entity).

To implement similar functionality during reconfiguration of a split bearer, the same techniques described above for an X2 handover of a non-split bearer may be reapplied. However, as will now be demonstrated, the result is a significant reduction in efficiency caused by retransmission of data unnecessarily. The following cases relate to the reconfiguration of a split bearer to a non-split bearer in which the PDCP entity within a MeNB remains following the reconfiguration and the RLC/MAC entities within a SeNB are removed.

Before illustrating specific examples, it is first clarified that it is assumed that also for a split bearer, RLC entities will in normal situations (other than for re-establishment) only deliver in sequence PDCP PDUs to the PDCP entity. However, since each RLC entity is only handling part of the PDCP PDUs, they do not necessarily need to be consecutive PDCP PDUs such that there could be gaps in the PDCP PDUs delivered by each RLC entity to a PDCP entity for a split bearer. At the RLC layer, in RLC Acknowledged Mode, for the uplink in the UE each RLC entity (one each for transmissions to eNB1 and eNB2) each PDCP PDU allocated for transmission to that eNB is numbered sequentially to form RLC PDUs, such that while there may be gaps in the numbering of PDCP PDUs sent to each eNB, there are no gaps for the RLC PDUs. At each eNB the RLC entity does not pass received RLC PDUs to the PDCP entity out of sequence.

Figure 9:
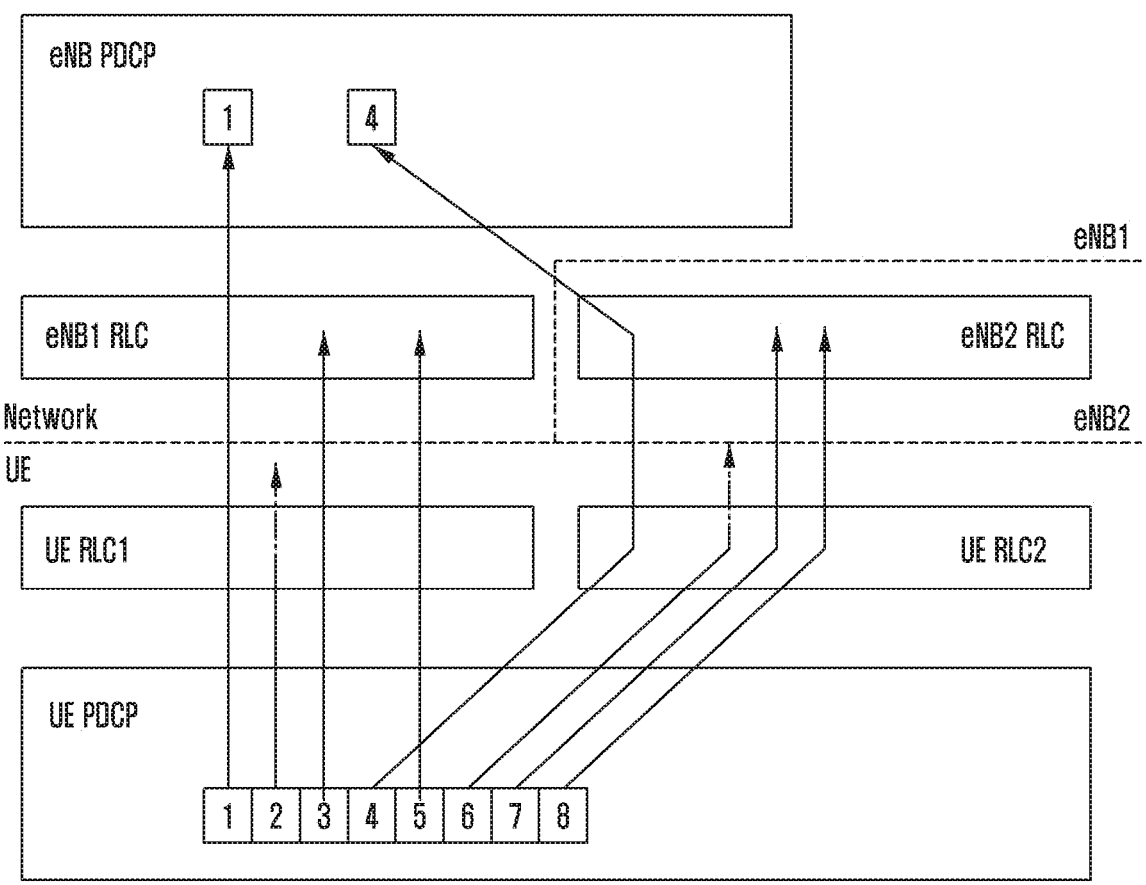
FIG. 9 illustrates the delivery situation for a split radio bearer immediately before reconfiguration to a non-split radio bearer.

FIG. 9 shows a possible delivery situation for a split radio bearer just before reconfiguration from a split bearer to a non-split bearer. PDCP PDU 1 is the last in sequence PDCP PDU delivered via eNB1 RLC (the MeNB RLC entity) to the PDCP entity. PDCP PDU 4 is the last in PDCP PDU delivered via eNB2 RLC (the SeNB RLC entity). The UE is aware that PDCP PDUs 1 and 4 have successfully transmitted based on lower layer confirmation. Transmission was also successful for PDCP PDUs 3, 5, 7 and 8 to the eNB RLC entities but all these PDUs remain buffered in the receiving RLC entity due to out of sequence reception (that is, the received RLC PDUs are out of sequence). PDCP PDUs 2 and 6 still need to be retransmitted by the UE though these have not necessarily failed transmissions. Since transmissions in eNB2 are discontinued, PDCP PDU6 cannot be received by the network PDCP entity unless there is a new retransmission from the UE. PDCP PDU2 will be delivered by the RLC/lower layers in eNB1 if these layers are not re-established.

The amount of unnecessary retransmissions resulting from the current UE behaviour will depend on the network behaviour, as will now be set out via several example cases. The description of the following cases is not exhaustive of all possible scenarios for current UE behaviour and current network behaviour. The following example cases vary according to whether the eNB1 RLC is re-established, whether there is forwarding from the enB1 (SeNB) to the eNB2 (MeNB) and whether the PDCP entity sends a PDCP status report. If the eNB1 RLC is not re-established then on-going transmissions (PDUs 2, 3 and 5) will continue and eventually these PDCP PDUs will be delivered to the PDCP entity (unless of course they later fail and no acknowledgement of receipt is received by the UE before the normal acknowledgement timer expires, in which case they would be retransmitted conventionally).

Case 1a: No eNB1 RLC Re-Establishment; No Forwarding of Out of Sequence PDCP PDUs from eNB2 RLC; No PDCP Status Report The resulting UE retransmissions following reconfiguration from a split bearer to a non-split bearer are shown in FIG. 10.

With the current UE behaviour the UE will restart transmissions from PDCP PDU 2 (the first PDCP PDU for which there is no confirmation of receipt by the lower level layers). PDCP PDUs 2, 3, 4 and 5 are unnecessarily retransmitted by the UE, and retransmission of PDCP SDU's 7 and 8 could have been avoided if eNB2 had forwarded out of sequence received PDUs.

Figure 11:
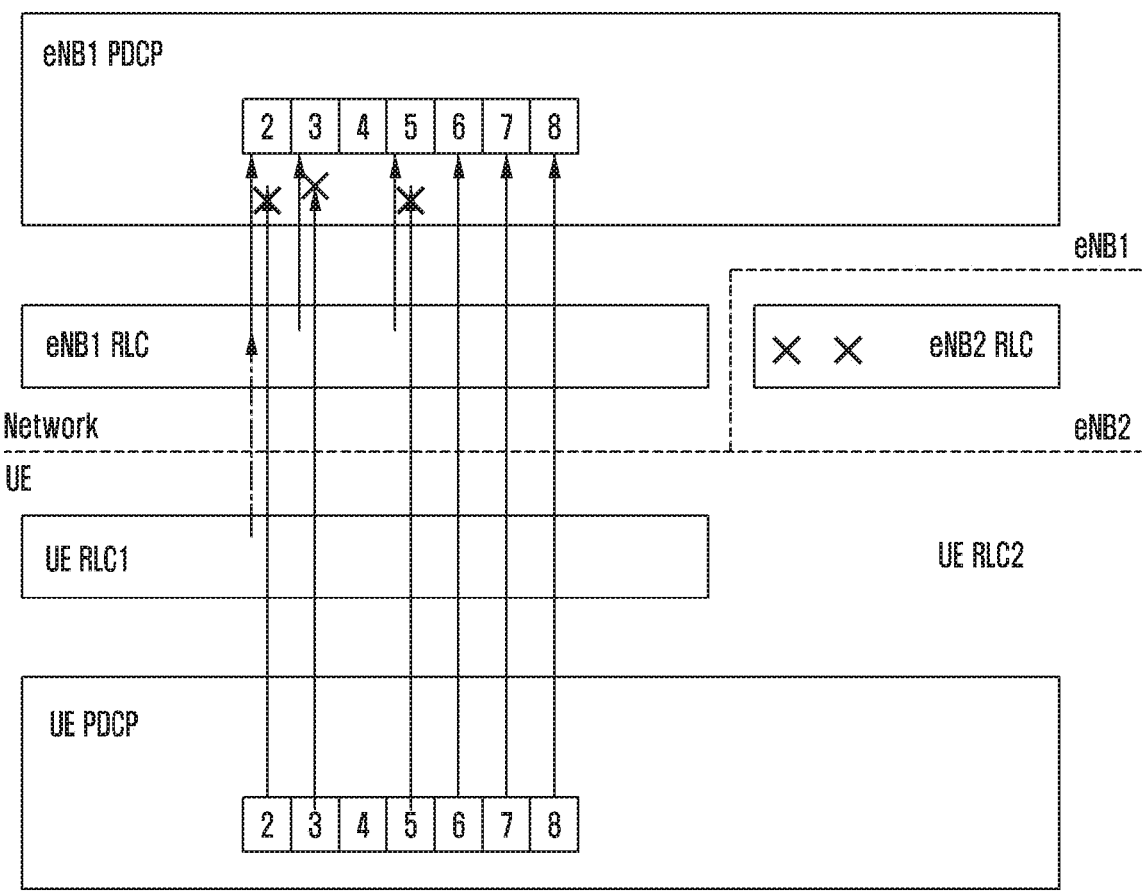

Case 1b: No eNB1 RLC Re-Establishment; No Forwarding of Out of Sequence PDCP PDUs from eNB2 RLC; PDCP Status Report This case differs from Case 1a only in the fact that the PDCP entity sends a PDCP status report during bearer reconfiguration. The resulting UE retransmissions following reconfiguration from a split bearer to a non-split bearer are shown in FIG. 11. It is clear that in this case the PDCP status report will indicate that PDCP PDUs 1 and 4 do not need to be retransmitted. It is questionable what the PDCP status report would say for PDCP PDUs 2, 3 and 5. Since these PDCP PDUs are not received by the PDCP entity, it is probable that the only thing the PDCP entity can say is that these PDCP PDUs need to be retransmitted.

With the current UE behaviour the UE will restart transmissions from PDCP PDU 2 and only skip PDCP PDU 4. PDCP PDUs 2, 3 and 5 are unnecessarily retransmitted by the UE, and retransmission of PDCP SDU's 7 and 8 could have been avoided if eNB2 had forwarded out of sequence received PDUs.

Figure 1:
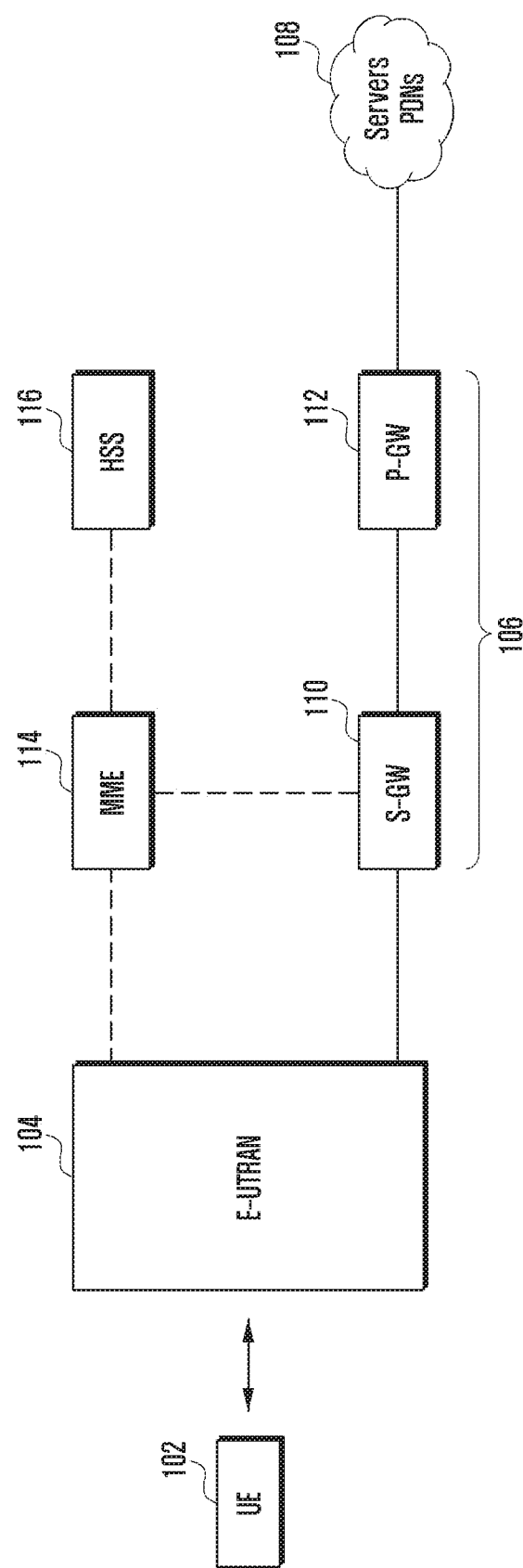
FIG. 1 schematically illustrates an overview of an LTE mobile communication network.
Figure 2:
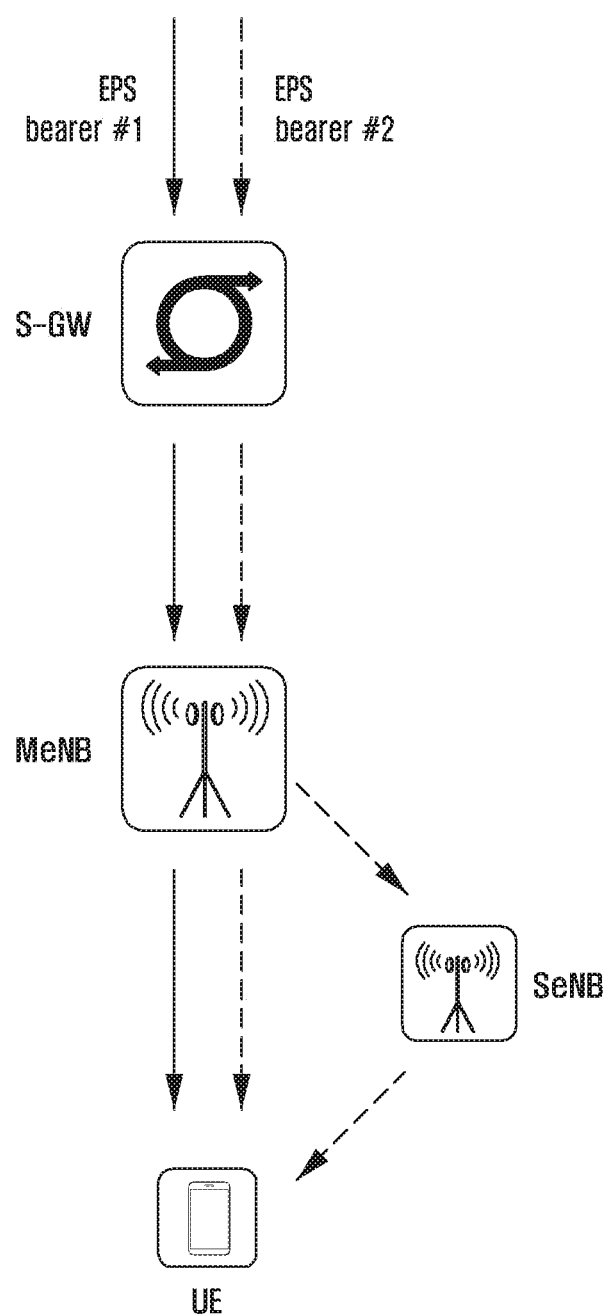
FIG. 2 illustrates a split bearer.
Figure 3:
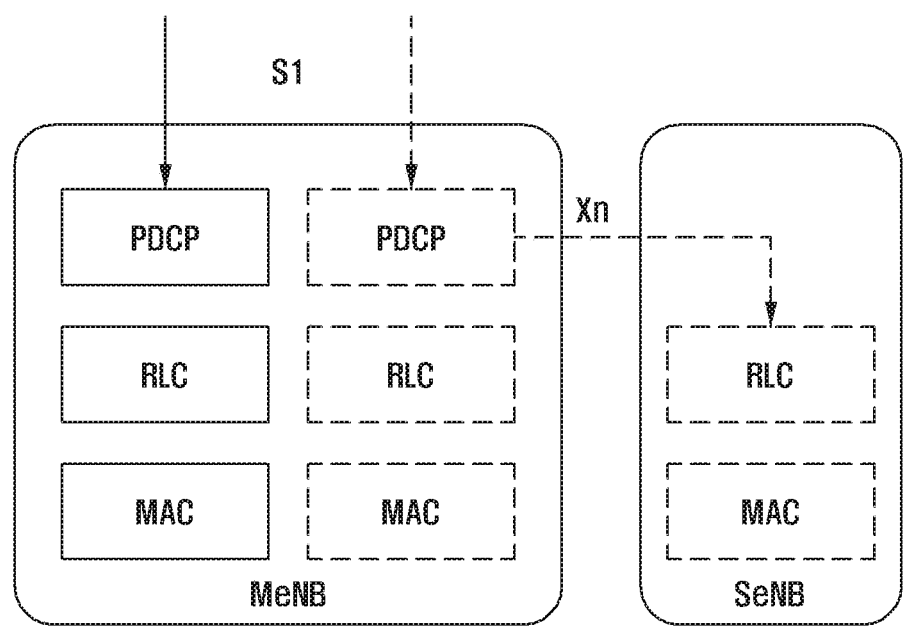
FIG. 3 illustrates a RAN protocol stack at a MeNB and a SeNB for the split bearer of FIG. 2.

Cases 1a and 1b are described for the sake of completeness. While the X2 handover scenario described above does include a network option where a source eNB may be configured not to forward out of sequence PDCP PDUs to a target eNB, this option is not typically called for in the somewhat different case of the reconfiguration from a split bearer to a non-split bearer. As noted in relation to FIG. 3, a typical split bearer architecture splits the layer 2 protocol stack between two components a Master eNB (MeNB) and a Secondary eNB (SeNB): a single PDCP entity is provided at the MeNB for the split bearer. This means that the SeNB must forward any PDCP PDUs it receives to the MeNB regardless and a "no forwarding out of sequence" option would have limited relevance in such a split bearer architecture.

Figure 12:
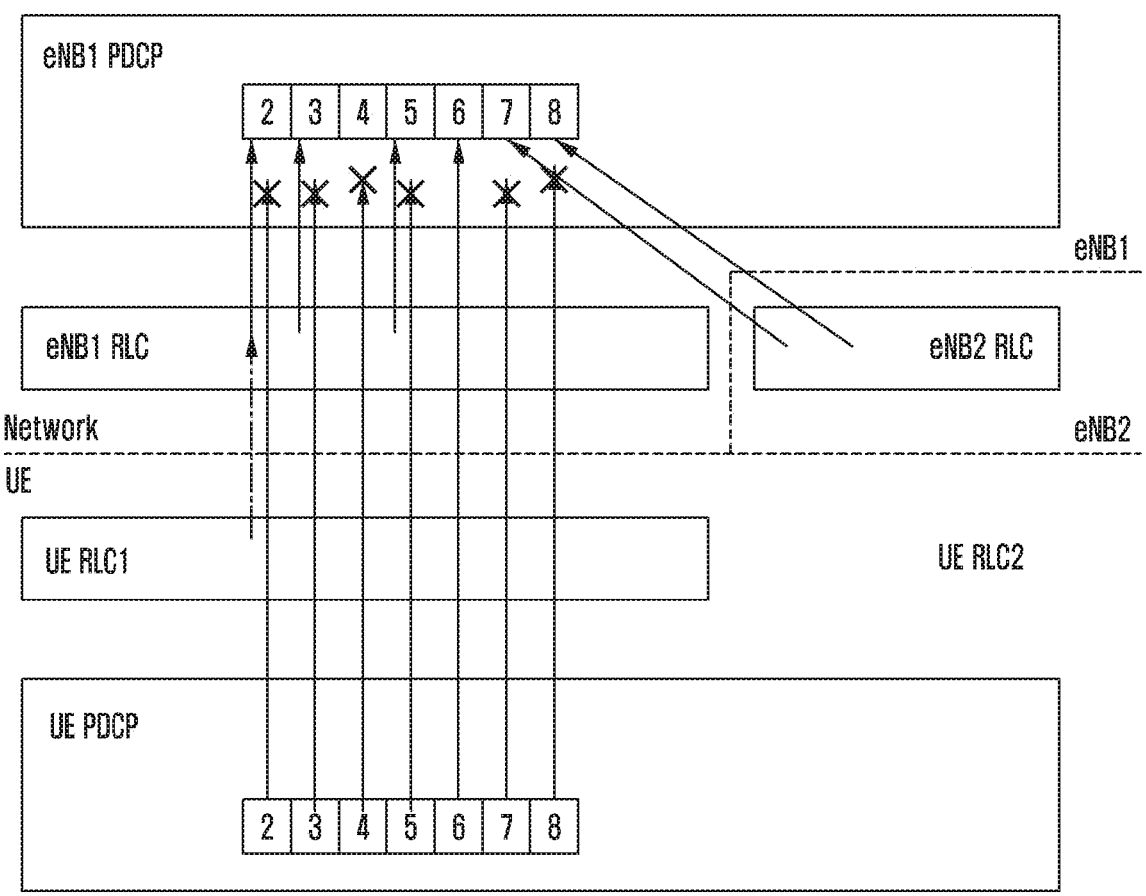

Case 2a: No eNB1 RLC Re-Establishment; Forwarding of Out of Sequence PDCP PDUs from eNB2 RLC; No PDCP Status Report This case differs from Case 1a only in that there is forwarding from eNB2 RLC. The resulting UE retransmissions following reconfiguration from a split bearer to a non-split bearer are shown in FIG. 12.

With the current UE behaviour the UE will restart transmissions from PDCP PDU 2. PDCP PDUs 2, 3, 4, 5, 7 and 8 are unnecessarily retransmitted by the UE.

Case 2b: No eNB1 RLC Re-Establishment; Forwarding of Out of Sequence PDCP PDUs from eNB2 RLC; PDCP Status Report This case differs from Case 1b only in that there is forwarding from eNB2 RLC. As for Case 1b, it is probable that the PDCP status report will not indicate that PDCP PDUs 2, 3 and 5 have been received. However, differing from Case 1b, the PDCP status report will indicate that PDCP PDUs 7 and 8 (in addition to PDCP PDUs 1 and 4) do not need to be retransmitted.

Figure 13:
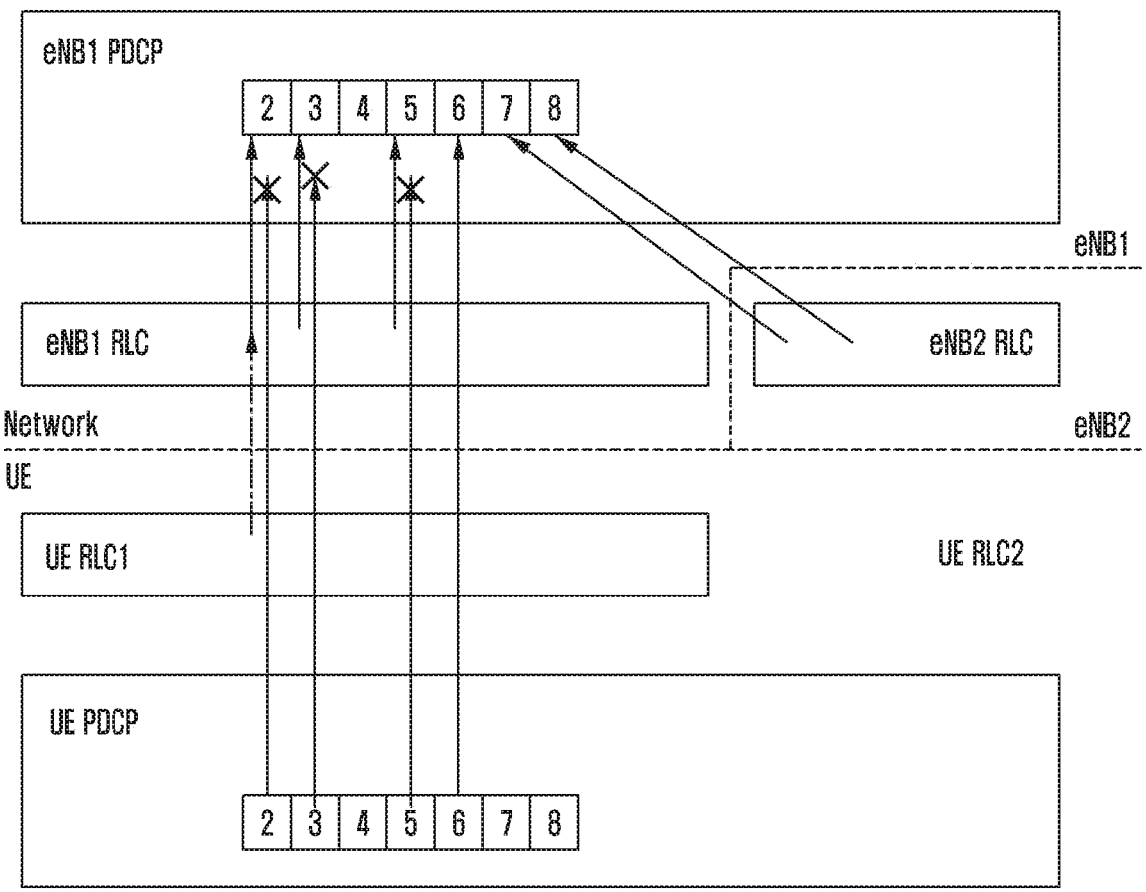

The resulting UE retransmissions following reconfiguration from a split bearer to a non-split bearer are shown in FIG. 13.

With the current UE behaviour the UE will restart transmissions from PDCP PDU 2 and only skip PDCP PDUs 4, 7 and 8. PDCP PDUs 2, 3 and 5 are unnecessarily retransmitted by the UE.

Case 3a: eNB1 RLC Re-Establishment; Forwarding of Out of Sequence PDCP PDUs from eNB2 RLC; No PDCP Status Report This case differs from Case 2a only in that the eNB1 RLC is re-established along with the corresponding UE RLC1 entity.

Figure 14:
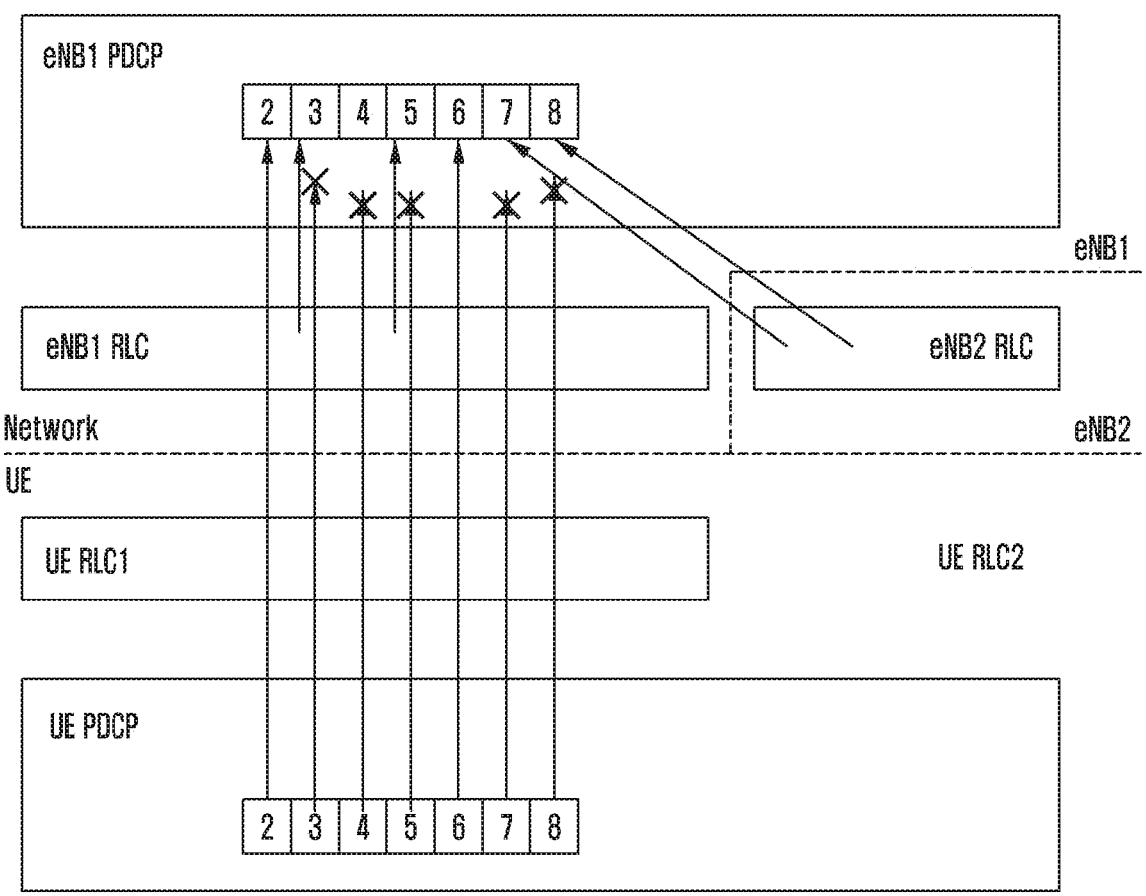

The resulting UE retransmissions following reconfiguration from a split bearer to a non-split bearer are shown in FIG. 14.

With the UE current behaviour the UE will restart transmissions from PDCP PDU 2. PDCP PDUs 3, 4, 5, 7 and 8 are unnecessarily retransmitted by the UE. PDCP PDU2 may also be unnecessarily retransmitted depending on whether already some part of the PDCP PDU 2 was received in the eNB1 RLC.

Case 3b: eNB1 RLC Re-Establishment; Forwarding of Out of Sequence PDCP PDUs from eNB2 RLC; PDCP Status Report This case differs from Case 2a only in that the eNB1 RLC is re-established along with the corresponding UE RLC1 entity.

Figure 15:
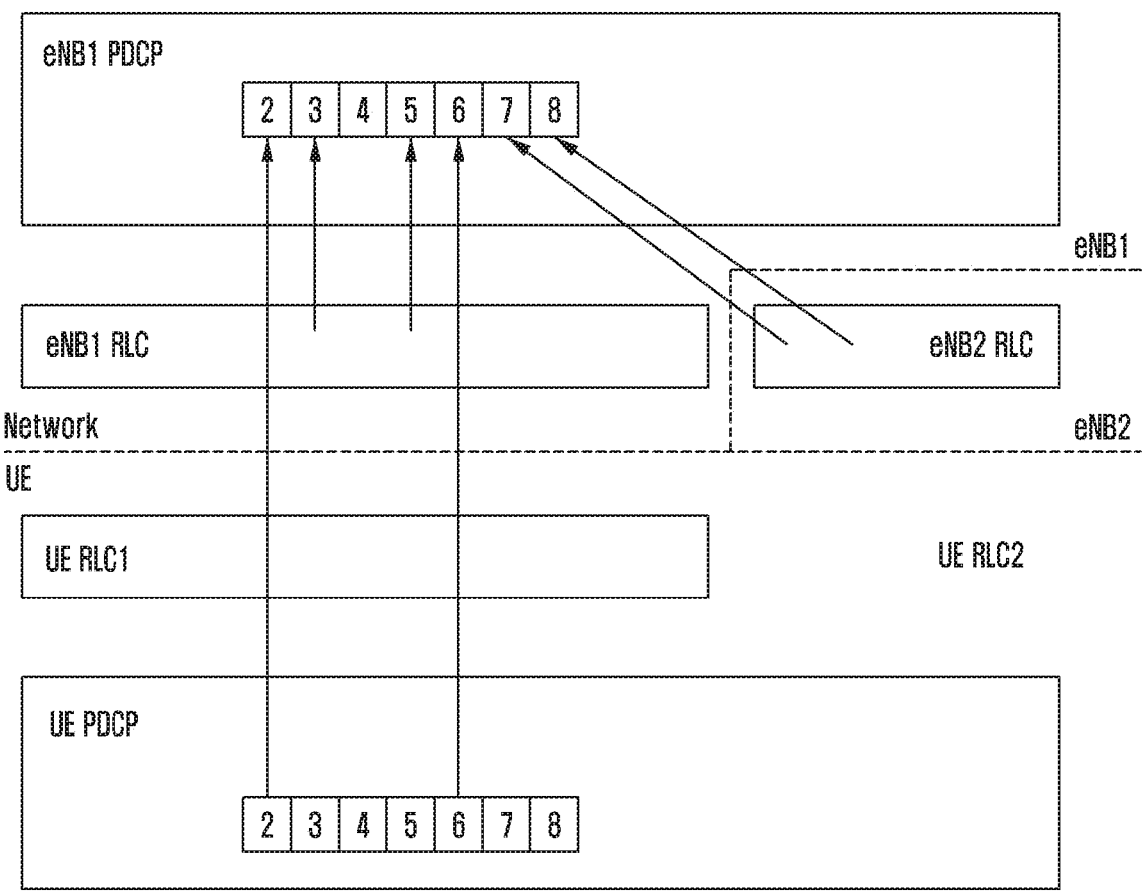

Due to the re-establishment of the eNB1 RLC entity, in this case PDCP PDUs 3 and 5, which were buffered in the eNB1 RLC, will be delivered to the eNB PDCP entity. Since PDCP PDUs 7 and 8 were also forwarded from the of the eNB2 RLC entity, and PDCP PDUs 1 and 4 were already delivered, the PDCP status report can indicated that PDCP PDU's 1, 3, 4, 5, 7 and 8 do not need to be retransmitted. The corresponding retransmission situation is shown in FIG. 15.

With the current UE behaviour the UE will restart transmissions from PDCP PDU 2. Assuming that the PDCP status report is received in time, only the UE only retransmits PDCP PDUs 2 and 6. PDCP PDU2 may be unnecessarily retransmitted depending on whether already some part of the PDCP PDU 2 was received in the eNB1 RLC.

The unnecessary retransmission of PDCP PDUs for the above cases 1a to 3b is shown in Table 1 below:

TABLE 1

Unnecessary retransmissions with currently specified UE behaviour.

| | eNB RLC1 re-establish eNB RLC1 re-establish | Forwarding from eNB2 Forwarding from eNB2 | PDCP status report PDCP status report | Unnecessarily retransmitted PDCP PDU | | | | Comment |
|---|---|---|---|---|---|---|---|---|
| | | | | 2 | 3/5 | 4 | 6 | 7/8 | Comment |
| 1a | No | No (A) | No | x | x | x | | x | |
| 1b | No | No (A) | Yes | x | x | | | x | |
| 2a | No | Yes (B) | No | x | x | x | | x | |
| 2b | No | Yes (B) | Yes | x | x | | | | |
| 3a | Yes | Yes (B) | No | x | x | x | | x | PDCP PDU2 possibly unnecessarily retransmitted |
| 3b | Yes | Yes (B) | Yes | x | | | | | PDCP PDU2 possibly unnecessarily retransmitted |

As we can see from Table 1, although usage of a PDCP status report improves the situation, especially if combined with forwarding between eNB2 and eNB1 and re-establishing eNB1 RLC, in none of the cases are all unnecessary retransmissions are avoided. That is, according to currently specified UE and network behaviour, it is not possible to fully eliminate all possible inefficient use of UE and eNB resources.

As disclosed herein in the event of reconfiguring a split bearer to a non-split bearer, the UE retransmission behaviour is changed relative to the current 3GPP specified behaviour. In place of having the UE restart transmissions of all PDCP SDUs from the first PDCP SDU for which the successful delivery of the corresponding PDCP PDU has not been confirmed by lower layers, the UE:

1) Restarts transmissions for PDCP SDUs from the first PDCP SDU for which transmission was attempted via the discontinued lower layer protocol stack part (at the SeNB) and for which the successful delivery of the corresponding PDCP PDU has not been confirmed by lower layers.

2) Furthermore, the UE only retransmits PDCP SDUs for which transmission of the corresponding PDCP PDU was attempted/performed via the discontinued lower layer protocol stack part.

That is, as disclosed herein there is no retransmission of PDCP SDUs for which a PDCP PDU has already been provided to the lower layer protocol stack part that is not discontinued (at the MeNB).

As a consequence, even if the UE receives a PDCP status report in this case indicating that certain PDCP PDUs are missing, this may not trigger retransmissions of PDCP PDUs already sent via the MeNB. Should those PDCP PDUs truly be missing then normal retransmission is initiated following expiry of a retransmission timer.

To illustrate this two further example cases are highlighted based upon the same delivery situation for a split radio bearer just before reconfiguration from a split bearer to a non-split bearer shown in FIG. 9.

Figure 16:
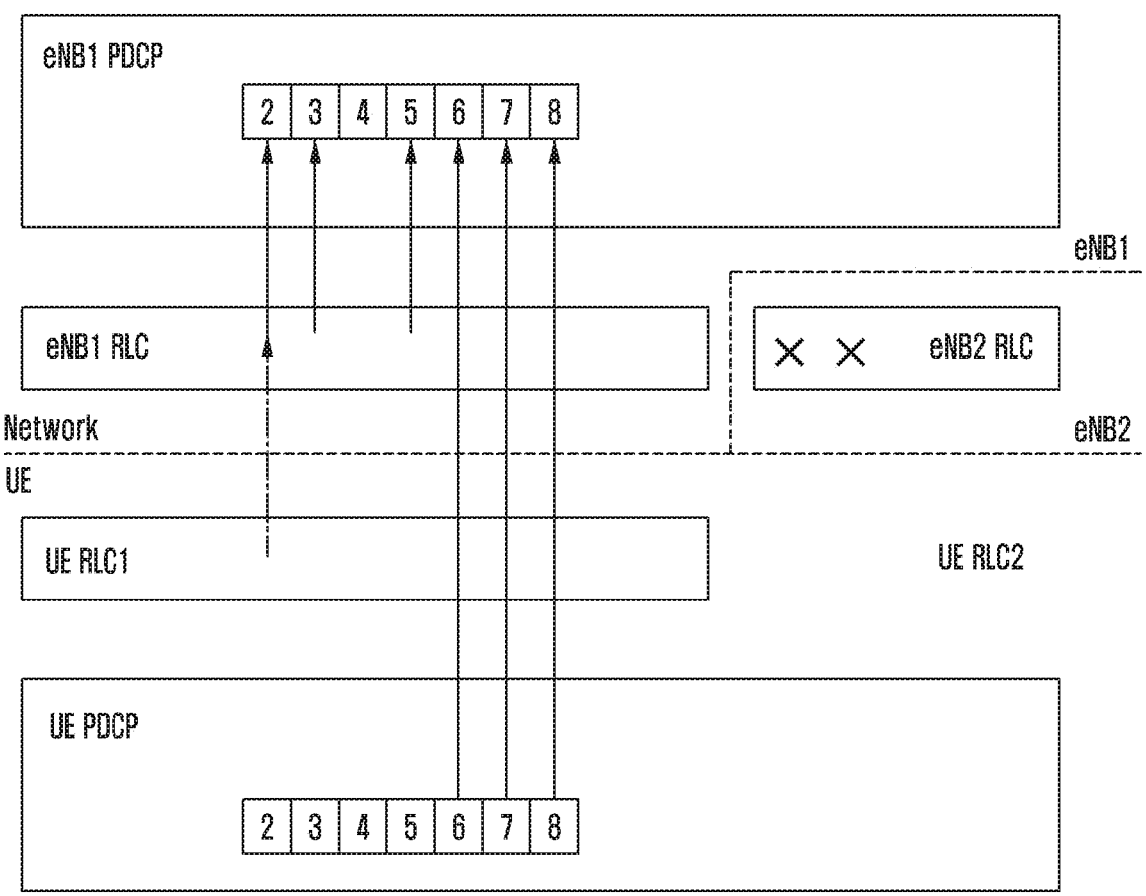
FIG. 16 illustrates PDCP SDU retransmissions for the delivery situation of FIG. 9 following reconfiguration to a non-split bearer.

Case 4a: No eNB1 RLC Re-Establishment; No Forwarding of Out of Sequence PDCP PDUs from eNB2 RLC; No PDCP Status Report The resulting UE retransmissions situation is shown in FIG. 16.

Since the UE will not consider PDCP PDUs transmitted via eNB1 for retransmission, retransmission for PDCP PDUs 2, 3 and 5 will not be triggered. Assuming that PDCP PDU 4 transmission was confirmed by lower layers of UE RLC2, the UE will only start retransmission from PDCP PDU6 and retransmit PDUs 6, 7 and 8.

If we compare this solution with Case 1a (as shown in Table 2 below), it can be seen that there is a clear reduction in the number of retransmitted PDCP PDUs.

TABLE 2

First comparison to current UE behaviour.

| | eNB RLC1 re-establish | Forwarding from eNB2 | PDCP status report | Unnecessarily retransmitted PDCP PDU | | | | Comment |
|---|---|---|---|---|---|---|---|---|
| | eNB RLC1 re-establish | Forwarding from eNB2 | PDCP status report | 2 | 3/5 | 4 | 6 | 7/8 Comment |
| 1a | No | No (A) | No | x | x x | | x | |
| 4a | No | No (A) | No | | | | x | |

Figure 17:
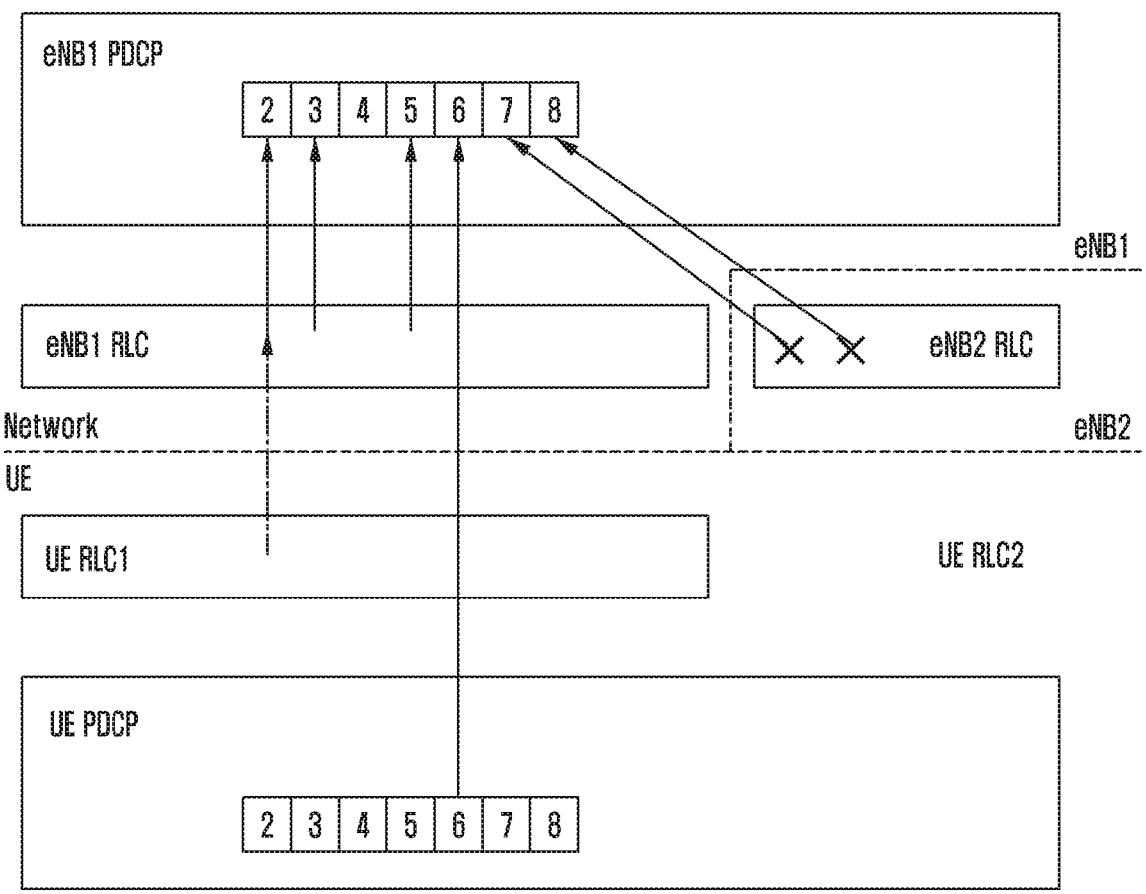
FIG. 17 illustrates PDCP SDU retransmissions for the delivery situation of FIG. 9 following reconfiguration to a non-split bearer.

Case 4b: No eNB1 RLC Re-Establishment; Forwarding of Out of Sequence PDCP PDUs from eNB2 RLC; PDCP Status Report The resulting UE retransmissions situation is shown in FIG. 17.

Since the UE will not consider PDCP PDUs transmitted via eNB1 for retransmission, retransmission for PDCP PDUs 2, 3 and 5 will not be triggered. Since the PDCP status report confirms that PDCP PDUs 4, 7 and 8 no longer need to be retransmitted, in the end only PDCP PDU 6 will be retransmitted.

If we compare this solution with Case 2b (as shown in Table 3 below), it can be seen that again there is a clear reduction in the number of retransmitted PDCP PDUs.

TABLE 3

Second comparison to current UE behaviour.

| | eNB RLC1 re-establish | Forwarding from eNB2 | PDCP status report | Unnecessarily retransmitted PDCP PDU | | | | Comment |
|---|---|---|---|---|---|---|---|---|
| | eNB RLC1 re-establish | Forwarding from eNB2 | PDCP status report | 2 | 3/5 | 4 | 6 | 7/8 Comment |
| 2b | No | Yes (B) | Yes | x | x | | | |
| 4b | No | Yes (B) | Yes | | | | | |

Advantageously, behaviour described above in connection with Case 4a and Case 4b are not reliant upon processing a PDCP status report to determine which PDCP PDUs to retransmit. A PDCP status report based approach might result in the UE having started certain PDCP PDU transmissions before receiving the PDCP status report (a race condition). If the UE has already started to retransmit unnecessary PDCP PDUs when the PDCP status report is received then this can result in a loss of efficiency.

Figure 18:
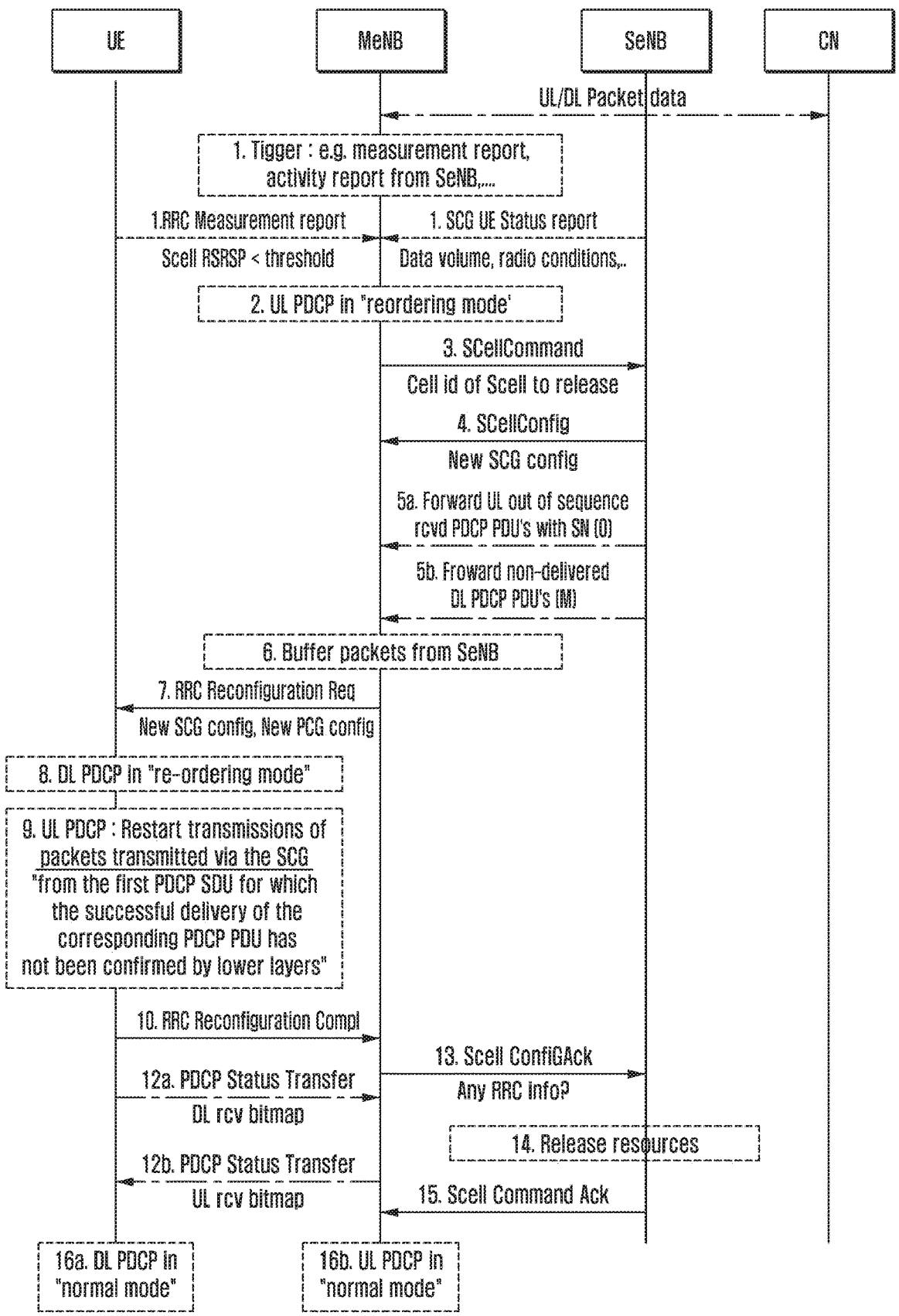
FIG. 18 illustrates a message flow during reconfiguration of a bearer.

Referring now to FIG. 18, this shows an example full sequence message flow for deletion of the last cell in a Secondary Cell Group (SCG) resulting also in the reconfiguration a split bearer to a non-split bearer. FIG. 18 shows messages transferred between the UE, the MeNB, the SeNB and the CN. Prior to release of the last cell in the SCG, at least one radio bearer serving the UE is split between the MeNB and the SeNB as described above in connection with FIG. 3.

At step 1 the MeNB obtains measurement information from the UE and/or status information from the SeNB. The measurement information or status information may be the trigger that causes the MeNB to decide to release the last cell in the SCG. There may be other triggers. Alternatively, the trigger may be some other status report. At step 2 the MeNB determines that release of the last cell in the SCG is required. The SeNB is instructed to release the last cell in the SCG at step 3 (the MeNB commands the SeNB to remove the SCG part of the bearer) and acknowledges this at step 4. Specifically, at step 4 the SeNB makes a new SeNB configuration to be sent to the UE and forwards this to the MeNB.

At step 5a the SeNB forwards out of sequence uplink PDCP PDUs. In Case 4a described above there is no such forwarding of uplink PDCP PDUs, yet the process functions correctly. At step 5b the SeNB forwards undelivered downlink PDCP PDUs to the MeNB. The PDUs are buffered by the MeNB at step 6.

At step 7 the MeNB instructs the UE to release the last cell in the SCG. At step 7 the MeNB sends the new SeNB configuration to the UE. At step 8 the UE begins to reorder received downlink PDCP PDUs. At step 9 the UE determines which uplink PDCP PDUs to retransmit as described above in connection with Case 4a and Case 4b. In Case 4a, there being no out of sequence forwarding at step 5a, all PDCP PDUs transmitted to the discontinued eNB protocol stack (at the SeNB) would be retransmitted. However, as noted above, in other cases such as Case 4b, only PDCP PDUs transmitted to the discontinued eNB protocol stack (at the SeNB), and for which no lower layer acknowledgement of receipt has been received, will be retransmitted.

At step 10 the UE signals to the MeNB that the release of the last cell in the SCG is complete and at step 12a the UE sends a PDCP status report including a bitmap indicating received and missing downlink PDCP PDUs. At step 12b, in accordance with the 3GPP specifications, the MeNB sends a PDCP status report indicating what retransmissions to make including a bitmap indicating received and missing uplink PDCP PDUs. However, this PDCP status report may be partially ignored and does not trigger retransmission of PDCP PDUs transmitted directly to the MeNB.

Steps 13, 14 and 15 relate to the release of radio resources by the SeNB. At step 13 the MeNB informs the SeNB about the UE response, and at step 14 the SeNB informs the MeNB that reconfiguration has been completed. At steps 16a and 16b the UE and the MeNB (which from now on may be simply referred to as the eNB) continue to operate in a "normal mode" in which a non-split bearer is used.

The modified retransmission behaviour of the UE described above could be captured within a modification to the relevant 3GPP specification (3GPP TS 36.323) as follows, with changes indicated by underlining.

5.2.1.1 Procedures for DRBs Mapped on RLC AM

When upper layers request a PDCP re-establishment due to reconfiguration of the radio bearer from a split bearer to a non-split bearer handled by the PCG, the UE shall:
  from the first PDCP SDU transmitted via the SCG for which the successful delivery of the corresponding PDCP PDU has not been confirmed by lower layers, perform retransmission of all PDCP SDUs for which initial transmission was performed via the SCG, in ascending order of the COUNT values associated to the PDCP SDU prior to the PDCP re-establishment as specified below:
    perform header compression of the PDCP SDU (if configured) as specified in the subclause 5.5.4;
    if connected as an RN, perform integrity protection (if configured) of the PDCP SDU using the COUNT value associated with this PDCP SDU as specified in the subclause 5.7;
    perform ciphering of the PDCP SDU using the COUNT value associated with this PDCP SDU as specified in the subclause 5.6;
    submit the resulting PDCP Data PDU to lower layer.

When upper layers request a PDCP re-establishment for other reasons, the UE shall:
  reset the header compression protocol for uplink and start with an IR state in U-mode (if configured) [9] [11];
  if connected as an RN, apply the integrity protection algorithm and key provided by upper layers (if configured) during the re-establishment procedure;
  apply the ciphering algorithm and key provided by upper layers during the re-establishment procedure;
  from the first PDCP SDU for which the successful delivery of the corresponding PDCP PDU has not been confirmed by lower layers, perform retransmission or transmission of all the PDCP SDUs already associated with PDCP SNs in ascending order of the COUNT values associated to the PDCP SDU prior to the PDCP re-establishment as specified below:
    perform header compression of the PDCP SDU (if configured) as specified in the subclause 5.5.4;
    if connected as an RN, perform integrity protection (if configured) of the PDCP SDU using the COUNT value associated with this PDCP SDU as specified in the subclause 5.7;
    perform ciphering of the PDCP SDU using the COUNT value associated with this PDCP SDU as specified in the subclause 5.6;
    submit the resulting PDCP Data PDU to lower layer.

It is noted that in this revised section of 3GPP TS 36.323 references to header compression, integrity protection and ciphering are unchanged from the case for PDCP re-establishment for other reasons, except that the header compression entity might not need to be reset. PCG stands for "primary cell group" and corresponds to cells in the MeNB, and SCG stands for "secondary cell group" and corresponds to cells in the SeNB.

Consideration of how UE retransmission behaviour may be improved to increase efficiency may be extended to considering a reconfiguration of an uplink non-split bearer to an uplink split bearer (the reverse situation to that described above).

Figure 19:
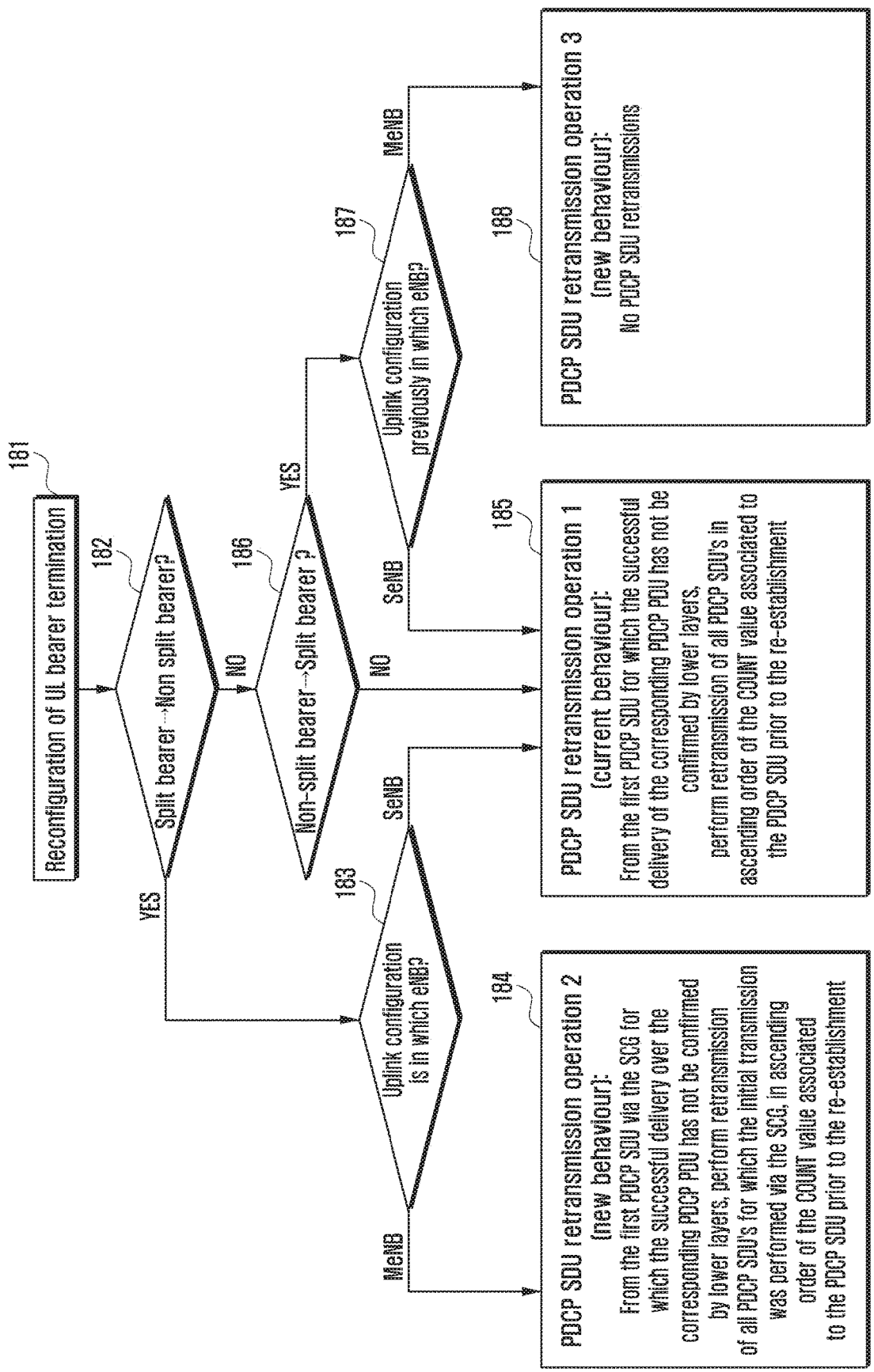
FIG. 19 is a flowchart illustrating a method of reconfiguring a bearer.

Referring now FIG. 19, this shows a flow chart illustrating retransmission behaviour at the UE. At step 181 the UE determines that reconfiguration of an uplink bearer termination is required. That is, the UE determines whether as a result of a re-establishment process retransmission of PDCP SDUs is required. At step 182 a determination is made whether the reconfiguration is from a split bearer to a non-split bearer. If it is determined that the reconfiguration is from a split bearer to a non-split bearer then at step 183 a determination is made where the uplink configuration is to be located after the reconfiguration to a non-split bearer. That is, it is determined where the PDCP entity is to be located at the network side after reconfiguration. Alternatively, step 183 may be viewed as determining for which eNB uplink PDU transmission is to be configured. As a further alternative, step 183 may be viewed as determining whether PDCP PDU transmission is to be allowed only in the Macro Cell Group (MCG) or only in the SCG.

If at step 183 it is determined that the PDCP entity will reside in the MeNB after reconfiguration then at step 184 the UE performs retransmission according to the process described above in connection with Case 4a and Case 4b.

That is, only PDCP PDUs which were transmitted via the SeNB, and which have not been confirmed as delivered, are retransmitted.

If at step 183 it is determined that the PDCP entity will reside in the SeNB then at step 185 the UE performs retransmission according to the existing 3GPP specified behaviour (all PDCP SDUs are retransmitted if there has been no acknowledgement of delivery via lower layers).

Alternatively, if at step 182 it is determined that the reconfiguration is not from a split bearer to a non-split bearer then at step 186 a determination is made whether the reconfiguration is from a non-split bearer to a split bearer. If it is determined that the reconfiguration is not from a non-split bearer to a split bearer then the flow passes to step 185 and the UE performs retransmission according to the existing 3GPP specified behaviour.

If at step 186 it is determined that the reconfiguration is from a non-split bearer to a split bearer then at step 187 a determination is made where the uplink configuration was located before the reconfiguration to a split bearer. That is, it is determined where the PDCP entity was located at the network side before reconfiguration. Alternatively, step 187 may be viewed as determining for which eNB uplink PDU transmission was previously located configured. As a further alternative, step 187 may be viewed as determining whether PDCP PDU transmission was previously only in in the MCG or only in the SCG.

If at step 187 it is determined that the PDCP entity previously resided in the SeNB then at step 185 the UE performs retransmission according to the existing 3GPP specified behaviour. Alternatively, if at step 187 it is determined that before reconfiguration the PDCP entity resided in the MeNB then at step 188 no PDCP SDU retransmissions are required. This may include if the MeNB sends a PDCP status report indicating that certain corresponding PDCP PDUs have not been received.

Figure 20:
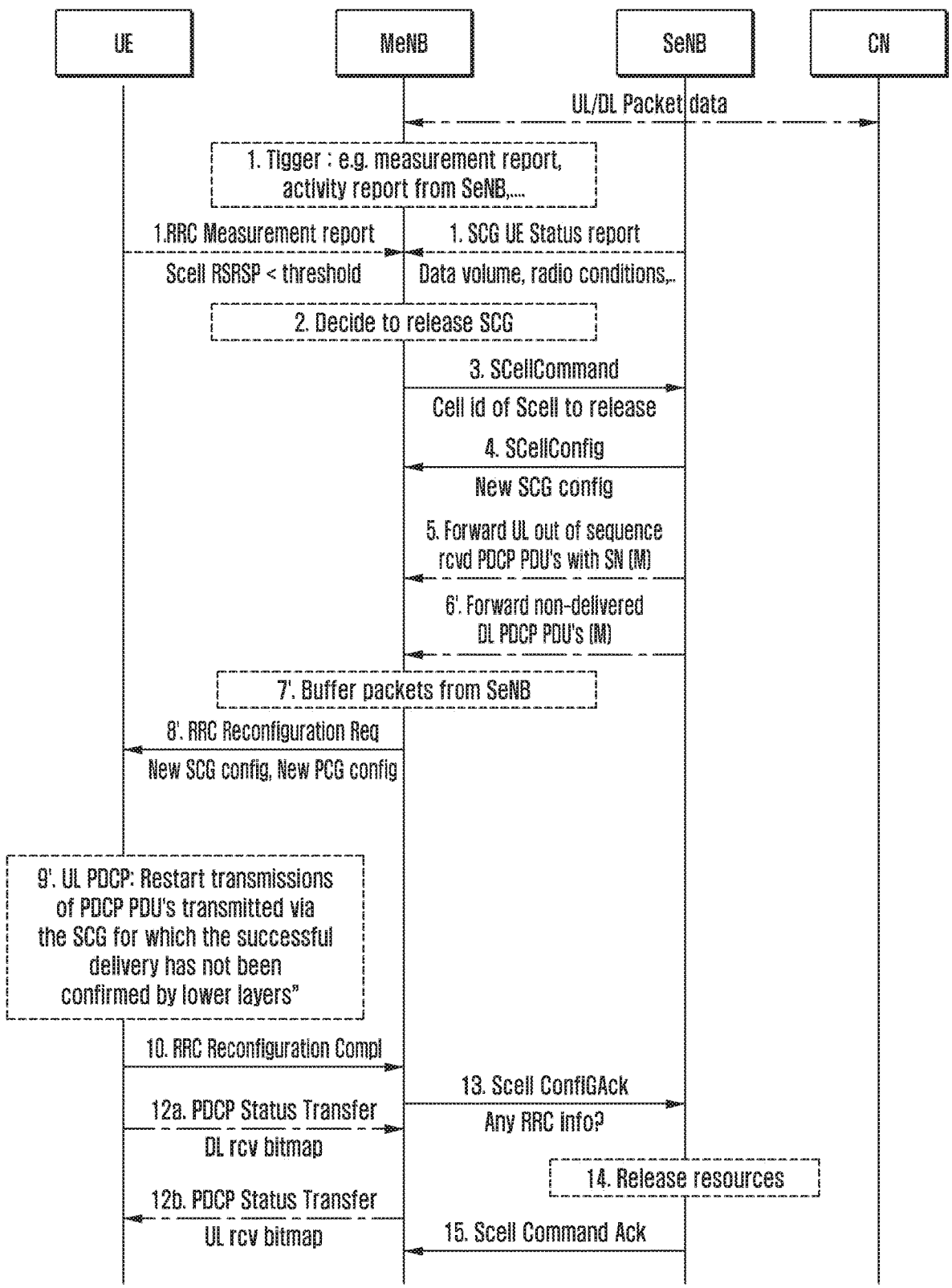
FIG. 20 illustrates a further exemplary message flow during reconfiguration of a bearer from split bearer to non-split bearer.

Referring now to FIG. 20, this shows a further example of a full sequence message flow for deletion of the last cell in a SCG resulting also in the reconfiguration a split bearer to a non-split bearer. Just as in FIG. 18, FIG. 20 shows messages transferred between the UE, the MeNB, the SeNB and the CN, wherein prior to release of the last cell in the SCG, at least one radio bearer serving the UE is split between the MeNB and the SeNB as described above in connection with FIG. 3.

With certain exceptions explained below, the steps of FIG. 20 are the same as for FIG. 18. FIG. 20, however, illustrates a message flow where no provision is made for a "no forward" option for the SeNB in respect of out of sequence PDCP PDUs. Thus at step 5, corresponding to step 5*a* of FIG. 18, the SeNB forwards out of sequence uplink PDCP PDUs to the MeNB. At step 6' the SeNB forwards undelivered downlink PDCP PDUs to the MeNB. The uplink and downlink PDUs are buffered by the MeNB at step 7.

At step 8' the MeNB instructs the UE to release the last cell in the SCG and sends the new SeNB configuration to the UE. At step 9' the UE determines which uplink PDCP PDUs to retransmit. In this example, only PDCP PDUs transmitted to the discontinued eNB protocol stack (i.e. the stack at the SeNB), and for which no lower layer acknowledgement of receipt has been received, will be retransmitted. The remaining steps of FIG. 20 correspond to the steps of FIG. 18 of the same number.

The modified retransmission behaviour of the UE described above in relation to FIG. 20 could be captured within an alternative modification to the relevant 3GPP specification (3GPP TS 36.323) as follows, with changes indicated by underlining.

5.2.1.1 Procedures for DRBs Mapped on RLC AM

When upper layers request a PDCP re-establishment due to reconfiguration of the radio bearer from a split bearer to a non-split bearer handled by the PCG, the UE shall:

perform retransmission of all PDCP PDUs for which initial transmission was performed via the SCG and for which the successful delivery of the corresponding PDCP PDU has not been confirmed by lower layers, in ascending order of the COUNT values associated to the PDCP SDU:

When upper layers request a PDCP re-establishment for other reasons, the UE shall:

reset the header compression protocol for uplink and start with an IR state in U-mode (if configured) [9] [11];

if connected as an RN, apply the integrity protection algorithm and key provided by upper layers (if configured) during the re-establishment procedure;

apply the ciphering algorithm and key provided by upper layers during the re-establishment procedure;

from the first PDCP SDU for which the successful delivery of the corresponding PDCP PDU has not been confirmed by lower layers, perform retransmission or transmission of all the PDCP SDUs already associated with PDCP SNs in ascending order of the COUNT values associated to the PDCP SDU prior to the PDCP re-establishment as specified below:

perform header compression of the PDCP SDU (if configured) as specified in the subclause 5.5.4;

if connected as an RN, perform integrity protection (if configured) of the PDCP SDU using the COUNT value associated with this PDCP SDU as specified in the subclause 5.7;

perform ciphering of the PDCP SDU using the COUNT value associated with this PDCP SDU as specified in the subclause 5.6;

submit the resulting PDCP Data PDU to lower layer.

It is noted that in this revised section of 3GPP TS 36.323 references to header compression, integrity protection and ciphering are unchanged from the case for PDCP re-establishment for other reasons, except that the header compression entity might not need to be reset. PCG stands for "primary cell group" and corresponds to cells in the MeNB, and SCG stands for "secondary cell group" and corresponds to cells in the SeNB.

Consideration of how UE retransmission behaviour may be improved to increase efficiency may be extended to considering a reconfiguration of an uplink non-split bearer to an uplink split bearer (the reverse situation to that described above).

Referring now FIG. 21, this shows a flow chart illustrating retransmission behaviour at the UE in the scenario outlined in the description of FIG. 20. Where the behaviour in FIG. 21 is the same as that in FIG. 19, the same reference number is used.

If at step 183' it is determined that the PDCP entity will reside in the MeNB after reconfiguration then at step 184' the UE performs retransmission, whereby only PDCP PDUs which were transmitted via the SeNB, and which have not been confirmed as delivered by lower layers, are retransmitted.

FIGS. 18 and 20 both illustrate the behaviour of the UE when a reconfiguration of a radio bearer is commanded between first and second configurations. The first configuration is where a radio bearer is configured with two bi-directional RLC entities (at a MeNB and a SeNB, and also duplicated at the UE). The second configuration is where a radio bearer is configured with one bi-directional RLC entity (at an eNB, and also duplicated at the UE). While noting that bearers are bi-directional (and both "paths" are typically used in a split bearer for the downlink), for the uplink in a split bearer the UE could be restricted to only transmitting PDCP PDUs via a single "path" (to an RLC entity at only the MeNB or the SeNB). In such a situation then if PDCP PDUs have been transmitted only to the MeNB, upon reconfiguring the bearer from the first configuration to the second configuration then no PDCP retransmissions may be required. Specifically, when bearer reconfiguration is commanded, the UE checks if reconfiguration of a bearer is from configuration 1 (split) to configuration 2 (non-split). If so, the UE checks whether in configuration 1 PDCP PDU transmission was allowed only to the SeNB (or only on SCG serving cells) or only to the MeNB. If PDCP PDU transmission was allowed only to the SeNB (only via SCG serving cells) then PDCP SDU retransmissions need to be performed in accordance with the current 3GPP standards, that is according to step 185. If, however, PDCP PDU transmission was allowed only to the MeNB then no retransmission is required, that is according to step 188. However, for simplicity, this UE behaviour is not included in FIG. 19 or FIG. 21, and it is assumed in FIGS. 19 and 21 that when in the first configuration (split bearer) PDCP PDUs are transmitted via both paths.

Certain reconfiguration behaviour described above is based upon modifications only to the way in which the UE responds to a bearer reconfiguration, and in particular how the UE determines which PDCP SDUs to retransmit to maximise resource efficiency. However, two further options for increasing resource efficiency during reconfiguration from a split bearer to a non-split bearer are now presented.

As a first option, and as described above in connection with Case 3b, the eNB1 RLC entity may be re-established when removing the eNB2 protocol stack part and a PDCP status report may be sent from eNB1 to the UE. If the network re-establishes the eNB1 RLC entity when deleting the protocol stack part in eNB2, out of sequence PDCP PDUs will be delivered to the PDPC entity which will improve the contents of the PDCP status report (no longer asking retransmission of PDCP PDUs 3 and 5 unnecessarily in the example of Case 3b). The UE behaviour may be that currently specified in the 3GPP standards, with the improvements in resource efficiency arising through appropriate configuration of the eNB1 behaviour. As discussed above in connection with Case 3b, partly received PDCP PDUs (for instance PDCP PDU 2) will be dropped by the RLC entity in eNB1, which may cause them to be at least partly unnecessarily retransmitted.

As a second option, rather than re-establishing the RLC entity in eNB1, the eNB1 RLC entity informs the PDCP entity about the reception status or PDCP PDUs. Again, this results in a more accurate PDCP status report. In accordance with the second option the transmission of PDCP PDU 2 to the eNB1 will continue, and PDCP PDU 2 will be retransmitted. It is noted that the second option requires modification to the 3GPP standards concerning the behaviour of the eNB RLC upon a change in a PDCP termination.

The bearer reconfiguration behaviour described above is concerned with determining whether a UE should retransmit uplink PDCP SDUs or PDUs (and if so, which PDCP SDUs or PDUs) upon bearer reconfiguration. When processing a PDCP SDU for transmission the UE PDCP entity carries out higher-level transport functions including header compression and ciphering. When a PDCP SDU is to be retransmitted the UE PDCP layer performs new ciphering and new header compression. For ciphering, if the SDU data remains the same (which is true for retransmission in this context) and if other ciphering inputs remain the same (for instance a cipher key and a PDCP sequence number) then the ciphering for the retransmitted SDU results in a ciphered PDCP PDU that is identical to the originally transmitted PDCP PDU. However, this is not necessarily the same for header compression.

Header compression is desirable over the air interface because for packet data streams consisting of small packets, the header can form a sizable proportion of the transmitted data. For example, for Voice Over IP a typical data payload may be 31 bytes, whereas the IP header alone may be 40 or 60 bytes. PDCP therefore makes use of Robust Header Compression (ROHC) which is a compression protocol defined by the Internet Engineering Task Force (IETF). With ROHC, the transmitting side typically sends a few full IP headers at the beginning of a new IP flow. For subsequent packets of the flow, typically only the header differences are sent (note: this is a simplified description of the ROHC operation but sufficient for understanding this invention). As the majority of the header remains unchanged (for instance, IP source address, IP destination address . . . ) the difference fields are considerably smaller, and may reduce the header to something like 1 to 3 bytes.

Using ROHC requires that the transmitter includes a compressor and the receiver includes a decompressor. The compressor and the decompressor maintain a compression context and a decompression context respectively which are used to determine how a header should be compressed and decompressed respectively by reference to previously transmitted packets. An example of the use of compression and decompression contexts is given below in Table 4.

TABLE 4

ROHC compression and decompression contexts.

| SDU sequence number | Compression context before processing PDU | Compression context after processing PDU | PDU sequence number | Decompression context before processing PDU | Decompression context after processing PDU |
|---|---|---|---|---|---|
| SDU1 | Empty | K | PDU1 | Empty | K' |
| SDU2 | K | L | PDU2 | K' | L' |
| SDU3 | L | M | PDU3 | L' | M' |
| SDU4 | M | N | PDU4 | M' | N' |

Referring to Table 4, SDU1 is the first PDCP SDU to be compressed at the UE. Consequently, the compression context is empty before processing the PDCP SDU to form a PDCP PDU. After compression the context is indicated by the letter K, and in practice the compression context may be the header of SDU1 in combination with other information. Similarly, at the eNB upon receipt of PDU1 the decompression context is initially empty as PDU1 is the first packet and so no compression has been applied. Afterwards the eNB PDCP entity stores a decompression context K' for processing the next received PDU. It will be understood that the compression context K and the decompression context K' may not be identical, but they will include corresponding information for compressing and decompressing the same packet.

When compressing the IP header of the next SDU2, the compressor will use compression context K which should give a good indication of the decompression context that the decompressor will be using when it receives PDU2 i.e. K'. It should be clear that if the compressor is using a completely different compression context/decompression context as reference for compression of SDUx compared to what the decompressor is using when receiving the corresponding PDUx, decompression is likely to fail at the decompressor. When PDCP SDU's are retransmitted following a bearer reconfiguration as described above, the compressor may no longer hold the original compression context which is most appropriate for compressing that SDU. If the compressor now just uses the latest compression context, which may have been updated as a result of subsequent transmissions for this IP flow, decompression failure may result. An example is shown in Table 5.

TABLE 5

ROHC compression and decompression contexts in the event of retransmission

| SDU sequence number | Compression context before processing PDU | Compression context after processing PDU | PDU sequence number | Decompression context before processing PDU | Decompression context after processing PDU |
| --- | --- | --- | --- | --- | --- |
| SDU1 | Empty | K | PDU1 | Empty | K' |
| SDU2 | K | L | | | |
| SDU3 | L | M | | | |
| SDU4 | M | N | | | |
| SDU2 | N | O | PDU2 | K' | |

Referring to Table 5, the first transmission of SDU2 was lost during the bearer reconfiguration. Although PDU3 and PDU4 may have been received by the receiver, still they are not provided to ROHC yet since the receiver will reorder received PDU's in order to enable ROHC to decompress packets in the same order as originally transmitted. Thus when the decompressor receives PDU2 it will use decompression context K' in line with original intentions. Now if the compressor uses the latest compression context N for compressing the retransmission of SDU2, the compressor may make the wrong assumptions with respect to what header differences have to be indicated in the compressed header and decompression may fail.

In accordance with certain embodiments of the present invention, in order to avoid decompression problems, where it proves necessary to retransmit data following bearer reconfiguration, under certain scenarios it is preferred to retransmit the original PDCP PDUs to ensure that compression applied to the retransmitted PDU is the same, and so the decompression context maintained by the receiver is appropriate. That is, a PDU upon which identically the same header compression is performed (or the original PDU, which has been stored) is retransmitted.

As described above, six bearer reconfiguration scenarios which may require data retransmission are considered, as summarised now in Table 6 for ease of reference in the following description. Appropriate data retransmission behaviour is described below for responding to each bearer reconfiguration scenario. While these behaviours may be described in combination, it will be appreciated that each may be separately implemented. That is, an embodiment of the present invention may comprise the retransmission behaviour for any one scenario in isolation, or the combination of behaviours for two or more scenarios in combination.

TABLE 6

| Scenario | Bearer reconfiguration |
| --- | --- |
| (a) | Split bearer (uplink PDUs sent to MeNB and SeNB) -> non-split bearer (MeNB) |
| (b) | Split bearer (uplink PDUs sent to MeNB and SeNB) -> non-split bearer (SeNB) |
| (c) | Non-split bearer (MeNB) -> split bearer |
| (d) | Non-split bearer (SeNB) -> split bearer |
| (e) | Split bearer (uplink PDUs sent only to MeNB) -> non-split bearer (MeNB) |
| (f) | Split bearer (uplink PDUs sent only to SeNB) -> non-split bearer (MeNB) |

Specifically, in accordance with an embodiment of the present invention for reconfiguration from a split bearer to a non-split bearer where retransmission only takes place for data previously transmitted to the discontinued eNB (scenarios (a) and (f)), the PDCP PDUs are retransmitted. In particular, if reconfiguration of a bearer from a split bearer to a non-split bearer in which uplink PDCP PDUs are transmitted only to the MeNB is detected (scenario (a)), in accordance with an embodiment of the present invention retransmission of PDCP PDUs is initiated from the first PDCP PDU for which transmission was attempted via the SeNB and for which there has been no confirmation of successful delivery by a protocol layer below the PDCP layer within the UE, and only PDCP PDUs for which transmission was attempted via the SeNB are retransmitted.

For reconfiguration of a split bearer to a non-split bearer where the non-split bearer is handled by the previous SeNB (scenario (b)), decompression is moved from the MeNB to the SeNB and so the whole ROHC compression and decompression context is released. Therefore, it is required that the PDCP SDUs are retransmitted (and so recompressed and decompressed according to a new context). Similarly, for reconfiguration of a non-split bearer to a split bearer where the non-split bearer was handled by the new SeNB (scenario (d)), decompression is moved to the MeNB from the SeNB and so the whole ROHC compression and decompression context is released. Therefore, it is required that the PDCP SDUs are retransmitted (and so recompressed and decompressed according to a new context).

For reconfiguration of a non-split bearer to a split bearer where the non-split bearer was handled by the new MeNB (scenario (c)), no retransmission of PDCP PDUs or SDUs are required.

For reconfiguration of a split bearer to a non-split bearer for which the non-split bearer is handled by the MeNB and for which for the split bearer transmissions of PDUs were only directed to the MeNB (scenario (e)) then no retransmissions of PDCP PDUs or SDUs are required. If, however, the split bearer transmissions of PDUs were only directed to the SeNB (scenario (f)), where data retransmission is required the method comprises initiating retransmission of PDCP PDUs from the first PDCP PDU for which there is no confirmation of successful delivery by a protocol layer below the PDCP layer within the UE, and retransmitting all PDCP PDUs from the first PDCP PDU.

It will be understood that the selective retransmission of PDCP PDUs or PDCP SDUs requires that the UE tracks which PDCP PDUs are sent to the MeNB and which are sent to the SeNB. This represents a processing overhead for the UE.

In accordance with further embodiments of the present invention, where retransmission of data is required following bearer reconfiguration, the data decompression problems outlined above in connection with Tables 4 and 5 may be differently addressed as will now be explained.

In accordance with a further embodiment of the present invention for reconfiguration from a split bearer to a non-split bearer where retransmission only takes place for data previously transmitted to the discontinued eNB, PDCP SDUs may be compressed and retransmitted so long as the compressed header information maintained within the corresponding PDU is sufficient to ensure correct decompression. Specifically, the UE must ensure that sufficient header information is maintained in the retransmitted PDU to guarantee that the decompression will be correctly performed by the receiving eNB using the decompression context corresponding to the originally transmitted PDU. This may comprise the UE including greater information in the compressed packet, for instance maintaining all dynamic fields uncompressed, or by sending the entire uncompressed header. In certain embodiments of the invention it may be that the UE is mandated to not perform header compression for retransmitted PDCP SDUs. Advantageously, this removes the need for a UE to determine on a case by case basis for data retransmission whether the SDU must be compressed again or whether the original PDU may be transmitted. It will be appreciated that the degree of uncompressed information retained in PDU headers may be left to the implementation of the UE. It will be appreciated that a particular UE may implement any combination of two or more from selective retransmission of PDCP PDUs, retransmitting PDCP SDUs with partially uncompressed headers and retransmitting PDCP SDUs with fully uncompressed headers. This UE selection may be varied from one packet to the next. It will be appreciated that if a particular radio bearer is not configured to implement header compression (for instance ROHC) then the above considerations do not apply and any of the various bearer reconfiguration retransmission behaviours described above are suitable.

As discussed above, for scenarios (a) and (f) PDCP PDUs are retransmitted in order to avoid decompression problems. However, it will be appreciated that if in a particular circumstance a PDCP SDU may be retransmitted (by ciphering the SDU again and performing header compression again) without the difference being detectable (relative to retransmission of the original PDU) to the receiving eNB then this may be advantageous as it avoids having to store the original PDCP PDU. This may be the case for data flows with little or no regularly changing dynamic fields, or if header compression is not applied (as noted in the preceding paragraph). However, according to the UE implementation it may be desirable to routinely retransmit PDCP PDUs for scenarios (a) and (f) as this avoids the processing overhead incurred in ciphering a PDCP SDU again.

It will be appreciated that scenarios (e) and (f) differ from scenario (a) only in that before reconfiguration to a non-split bearer, uplink PDUs are only sent to one or other of the MeNB and the SeNB. While scenario (e) represents an efficiency gain as the number of retransmissions is reduced, it will be appreciated that the retransmission behaviour described in connection with scenario (a) remains suitable for correctly responding to scenarios (e) and (f). Therefore in accordance with a further embodiment of the present invention, for reconfiguration of a split bearer to a non-split bearer for which the non-split bearer is handled by the MeNB, even if prior to the reconfiguration PDCP PDUs are only transmitted to one of the MeNB and the SeNB, retransmission of PDCP PDUs is initiated from the first PDCP PDU for which transmission was attempted via the SeNB and for which there has been no confirmation of successful delivery by a protocol layer below the PDCP layer within the UE, and only PDCP PDUs for which transmission was attempted via the SeNB are retransmitted.

As discussed above, in connection with scenarios (a), (e) and (f) for reconfiguration from a split bearer to a non-split bearer (using the MeNB) it is unnecessary to retransmit data transmitted to the MeNB. This is because the MeNB RLC entity is not re-established, and so to retransmit PDCP PDUs to the MeNB would result in unnecessary PDCP PDU retransmissions. The PDCP PDU may well have already been received by the network and the UE may expect to shortly receive the RLC acknowledgment from the RLC entity at the MeNB. If the RLC acknowledgement is not received then the PDCP PDU will be automatically retransmitted by the UE RLC entity as normal upon expiry of the conventional retransmit timer, without requiring processing by the UE PDCP entity. As discussed above, for the UE PDCP entity to have to remember which PDUs are transmitted via the MeNB and which are transmitted via the SeNB adds complexity to the UE. Taking into account the fact that the UE will be likely to receive a PDCP status report from the network shortly after the bearer reconfiguration, the status report will in any case be likely to avoid much of the unnecessary retransmissions (for those PDCPs still being handled by the RLC retransmissions in the MeNB at the time of the status report which accounts for much of the unnecessary retransmissions in the scenario (a)). Therefore, in accordance with certain embodiments of the invention, if the burden on the UE having to remember to which eNB a particular PDCP PDU was transmitted is considered to be too high, an alternative retransmission approach may be considered. Specifically, following reconfiguration from a split bearer to a non-split bearer (using the MeNB scenarios (a), (e) and (f)) all PDCP SDUs or PDCP PDUs may be retransmitted from the first PDCP SDU or PDCP PDU respectively for which reception is not confirmed by lower layers in the SeNB. This could be considered to be a less efficient solution than certain of the solutions described above. This is because there may be retransmissions of SDUs or PDUs transmitted to the MeNB if they were transmitted after the first failed transmission to the SeNB. However, it is considered that this is a simpler retransmission scenario which may be desirable for certain implementations.

In accordance with a further embodiment of the present invention, retransmission behaviour in connection with scenarios (a) and (f) may form part of a full or partial PDCP re-establishment procedure.

Conventional PDCP re-establishment requires that at the UE for the uplink: header compression (for instance, ROHC) is reset; a new ciphering key is established; and PDCP SDUs previously transmitted are retransmitted for any PDCP SDUs for which delivery is not confirmed. For the downlink: received PDCP PDUs are processed due to lower layer re-establishment; header compression (for instance, ROHC) is reset; a new ciphering key is established; and a PDCP status report is triggered.

In accordance with certain embodiments of the invention PDCP partial re-establishment requires that at the UE for the uplink: header compression (for instance, ROHC) is continued without resetting; the existing ciphering key continues to be used; and data retransmission is performed according to any of the above described retransmission behaviours, and in particular those retransmission behaviours described in connection with scenarios (a) to (f). For the downlink: received PDCP PDUs are processed due to lower layer re-establishment; header compression (for instance, ROHC) is continued without resetting; the existing ciphering key continues to be used; and a PDCP status report is triggered.

As discussed above, if no header compression is configured for a bearer then for data retransmission either PDCP SDUs or PDCP PDUs may be retransmitted at the option of the UE. This remains the case for retransmissions as part of a full or partial re-establishment procedure. Under these circumstances, retransmitting PDCP SDUs means that PDCP SDUs are processed again and retransmitted after re-establishment is completed. Conversely, retransmitting PDCP PDUs means that PDCP PDUs having been processed before re-establishment are retransmitted. Advantageously, in accordance with certain embodiments, to avoid the PDCP entity buffering both PDCP SDUs and PDCP PDUs in the PDCP buffer, the PDCP entity may fetch RLC SDUs from the RLC entity when partial re-establishment occurs.

The partial re-establishment may either be implicitly triggered in response to the occurrence of certain events, or explicitly triggered by the network through an RRC control command transmitted to the UE. In accordance with the prior art PDCP re-establishment is event based and only occurs if handover is instructed or if RRC connection re-establishment occurs. The PDCP re-establishment is applied to all Acknowledged Mode Data Radio Bearers (AM DRBs).

In accordance with an embodiment of the present invention event based (implicit triggering) allows the UE PDCP entity to be re-established (or partially re-established), and so allow PDCP SDU or PDCP PDU retransmission, in response to a bearer reconfiguration as follows:

If the following type of bearer reconfiguration occurs, PDCP re-establishment is applied to the corresponding DRB:

reconfiguration from non-split MCG bearer to a non-split SCG bearer (the PDCP network entity for the bearer moves from the MCG to the SCG and so PDCP re-establishment is required to maintain functionality following the reconfiguration)

reconfiguration from non-split SCG bearer to a non-split MCG bearer (the PDCP network entity for the bearer moves from the SCG to the MCG and so PDCP re-establishment is required to maintain functionality following the reconfiguration)

reconfiguration from non-split SCG bearer to a non-split SCG bearer (the SCG bearer is reconfigured so that it is moved from one SeNB to another and so PDCP re-establishment is required to maintain functionality following the reconfiguration)

reconfiguration from non-split MCG bearer to a non-split MCG bearer (in the case that the PDCP network entity for the bearer moves due to a change of MeNB or a change of primary cell in the MeNB, which therefore requires a handover including PDCP re-establishment for all bearers)

reconfiguration from a split MCG bearer to a non-split SCG bearer (as the PDCP entity moves from the MeNB to the SeNB, PDCP re-establishment is required)

reconfiguration from non-split SCG bearer to a split bearer (the PDCP entity for the bearer moves and so PDCP re-establishment is required)

If the following type of bearer reconfiguration occurs, PDCP partial re-establishment is applied to the corresponding DRB:

reconfiguration from split bearer to a non-split MCG bearer (as there is no change of the PDCP network entity, partial re-establishment is sufficient and there is limited lost data due to stopping part of the transmission stack, which will be recovered using conventional retransmission techniques)

reconfiguration from a first split bearer to a second split bearer (the reconfiguration comprises changing SeNB, however as the PDCP entity remains in the MeNB no change in PDCP entity is assumed and so partial re-establishment is sufficient—there is limited lost data due to stopping part of the transmission stack, which will be recovered using conventional retransmission techniques In summary, for bearer reconfigurations in which the PDCP network entity remains the same, and there are no other changes at the same time such as handover, then partial PDCP re-establishment may be used. If, however, during reconfiguration the MeNB changes or the primary cell in the MeNB changes then security for all bearers must be reinitiated and a full PDCP re-establishment procedure is required for all bearers. A handover procedure may be used in these circumstances in place of a single bearer move.

In accordance with an embodiment of the present invention explicit triggering allows the UE PDCP entity to be re-established (or partially re-established), and so allow PDCP SDU or PDCP PDU retransmission through an indicator (for instance, a single bit) included in an RRC message sent from the network to the UE. The indicator may be sent in addition to bearer configuration information association with the bearer reconfiguration (which may for instance be sent in recognition that a currently used eNB is becoming overloaded). For a single bit indicator, the value of the indicator instructs the UE whether full or partial re-establishment is to be performed.

It will be appreciated that embodiments of the present invention can be realized in the form of hardware, software or a combination of hardware and software. Any such software may be stored in the form of volatile or non-volatile storage, for example, a storage device like a ROM, whether erasable or rewritable or not, or in the form of memory, for example, RAM, memory chips, device or integrated circuits or on an optically or magnetically readable medium, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present invention. Accordingly, embodiments provide a program comprising code for implementing apparatus or a method as claimed in any one of the claims of this specification and a machine-readable storage storing such a program. Still further, such programs may be conveyed electronically via any medium including a communication signal carried over a wired or wireless connection and embodiments suitably encompass the same.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers or characteristics described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. It will be also be appreciated that, throughout the description and claims of this specification, language in the general form of "X for Y" (where Y is some action, activity or step and X is some means for carrying out that action, activity or step) encompasses means X adapted or arranged specifically, but not exclusively, to do Y.

The reader's attention is directed to all papers and documents which are filed concurrently with or previous to this specification in connection with this application and which are open to public inspection with this specification, and the contents of all such papers and documents are incorporated herein by reference . . . .

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method by a terminal, the method comprising:
receiving, from a base station, a radio resource control (RRC) connection reconfiguration message including configuration information for release of a secondary serving cell;
identifying a bearer type based on the configuration information; and
retransmitting, in a case that the bearer type is changed from a split bearer to a non-split bearer, a packet data convergence protocol (PDCP) protocol data unit (PDU) for which a successful delivery has not been confirmed without PDCP re-establishment.

2. The method of claim 1, wherein the non-split bearer includes a master cell group (MCG) bearer related to a first cell.

3. The method of claim 2,
wherein retransmitting of the PDCP PDU further comprises retransmitting, in the case that the bearer type is changed from the split bearer to the MCG bearer, the PDCP PDU to the first cell, and
wherein data transmitted via the first cell is not retransmitted.

4. The method of claim 1, wherein retransmitting of the PDCP PDU further comprises retransmitting the PDCP PDU in ascending order of an associated count value from a first PDCP PDU for which the successful delivery is not confirmed.

5. A method by a base station, the method comprising:
transmitting, to a terminal, a radio resource control (RRC) connection reconfiguration message including configuration information for release of a secondary serving cell; and
re-receiving, in a case that the bearer type is changed from a split bearer to a non-split bearer, a packet data convergence protocol (PDCP) protocol data unit (PDU) for which a successful delivery has not been confirmed without PDCP re-establishment,
wherein the bearer type is identified based on the configuration information.

6. The method of claim 5,
wherein the non-split bearer includes a master cell group (MCG) bearer related to a first cell,
wherein re-receiving of the PDCP PDU further comprises re-receiving, in the case that the bearer type is changed from the split bearer to the MCG bearer, the PDCP PDU to the first cell, and
wherein data transmitted via the first cell is not retransmitted.

7. The method of claim 5, wherein the PDCP PDU is re-received in ascending order of an associated count value from first PDCP PDU for which the successful delivery is not confirmed.

8. A terminal, comprising:
a transceiver; and
at least one processor configured to:
receive, from a base station, a radio resource control (RRC) connection reconfiguration message including configuration information for release of a secondary serving cell,
identify a bearer type based on the configuration information, and
retransmit, in a case that the bearer type is changed from a split bearer to a non-split bearer, a packet data convergence protocol (PDCP) protocol data unit (PDU) for which a successful delivery has not been confirmed without PDCP re-establishment.

9. The terminal of claim 8, wherein the non-split bearer includes a master cell group (MCG) bearer related to a first cell.

10. The terminal of claim 9,
wherein the at least one processor is further configured to retransmit, in the case that the bearer type is changed from the split bearer to the MCG bearer, the PDCP PDU to the first cell, and
wherein data transmitted via the first cell is not retransmitted.

11. The terminal of claim 8, wherein the at least one processor is further configured to retransmit the PDCP PDU in ascending order of an associated count value from a first PDCP PDU for which the successful delivery is not confirmed.

12. A base station, comprising:
a transceiver; and
at least one processor configured to:
 transmit, to a terminal, a radio resource control (RRC) connection reconfiguration message including configuration information for release of a secondary serving cell, and
 re-receive, in a case that the bearer type is changed from a split bearer to a non-split bearer, a packet data convergence protocol (PDCP) protocol data unit (PDU) for which a successful delivery has not been confirmed without PDCP re-establishment,
wherein the bearer type is identified based on the configuration information.

13. The base station of claim 12, wherein the non-split bearer includes a master cell group (MCG) bearer related to a first cell.

14. The base station of claim 13,
wherein the at least one processor is further configured to re-receive, in the case that the bearer type is changed from the split bearer to the MCG bearer, the PDCP PDU to the first cell, and
wherein data transmitted via the first cell is not retransmitted.

15. The base station of claim 12, wherein the PDCP PDU is re-received in ascending order of an associated count value from first PDCP PDU for which the successful delivery is not confirmed.

* * * * *